(12) United States Patent
Tsai et al.

(10) Patent No.: US 9,113,169 B2
(45) Date of Patent: Aug. 18, 2015

(54) VIDEO ENCODING WITH TEMPORALLY CONSTRAINED SPATIAL DEPENDENCY FOR LOCALIZED DECODING

(75) Inventors: Ming-Chang Tsai, San Diego, CA (US); Chia-Yuan Teng, San Diego, CA (US); Yan Ye, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 439 days.

(21) Appl. No.: 12/436,946

(22) Filed: May 7, 2009

(65) Prior Publication Data

US 2010/0284460 A1 Nov. 11, 2010

(51) Int. Cl.

| H04N 7/12 | (2006.01) |
|---|---|
| H04N 11/02 | (2006.01) |
| H04N 11/04 | (2006.01) |
| H04N 19/55 | (2014.01) |
| H04N 19/176 | (2014.01) |
| H04N 19/70 | (2014.01) |
| H04N 19/61 | (2014.01) |
| H04N 19/132 | (2014.01) |
| H04N 19/136 | (2014.01) |
| H04N 19/162 | (2014.01) |
| H04N 19/17 | (2014.01) |

(52) U.S. Cl.
CPC .............. *H04N 19/55* (2013.01); *H04N 19/132* (2013.01); *H04N 19/136* (2013.01); *H04N 19/162* (2013.01); *H04N 19/17* (2013.01); *H04N 19/176* (2013.01); *H04N 19/61* (2013.01); *H04N 19/70* (2013.01)

(58) Field of Classification Search
None
See application file for complete search history.

(56) References Cited

U.S. PATENT DOCUMENTS

| 5,793,895 | A | 8/1998 | Chang et al. | |
|---|---|---|---|---|
| 6,025,879 | A * | 2/2000 | Yoneyama et al. | ...... 375/240.24 |
| 6,683,988 | B1 | 1/2004 | Fukunaga et al. | |
| 8,724,707 | B2 | 5/2014 | Tsai et al. | |
| 2004/0012510 | A1 * | 1/2004 | Chen | .............................. 341/50 |
| 2004/0179609 | A1 | 9/2004 | Takahashi et al. | |

(Continued)

FOREIGN PATENT DOCUMENTS

| CN | 1875637 A | 12/2006 |
|---|---|---|
| CN | 101009833 A | 8/2007 |

(Continued)

OTHER PUBLICATIONS

Gabbouj M et al: "Isolated Regions in Video Coding" IEEE Transactions on Multimedia, IEEE Service Center, Piscataway, NJ, US, vol. 6, No. 2, Apr. 2004, pp. 259-267 ISSN: 1520-9210.

(Continued)

*Primary Examiner* — Frederick Bailey
(74) *Attorney, Agent, or Firm* — Brent A. Boyd

(57) ABSTRACT

This disclosure describes techniques for region-of-interest (ROI) encoding. In accordance with the techniques described herein, an encoding device may determine a temporal spatial dependency value for a candidate reference video block for inter-coding a current block in a video frame. The encoding device may compare the temporal spatial dependency value to a threshold value and select a coding mode for the current block based on the comparison. A decoding device may receive data defining a ROI as well as the temporal spatial dependency value and decode a video block in the ROI based at least in part on the temporal spatial dependency value. In this manner, the techniques of this disclosure may allow a video content viewer the ability to choose a ROI to watch.

29 Claims, 15 Drawing Sheets

(56) References Cited

U.S. PATENT DOCUMENTS

| | | | |
|---|---|---|---|
| 2006/0002472 A1 | 1/2006 | Mehta et al. | |
| 2006/0078051 A1* | 4/2006 | Liang et al. | 375/240.24 |
| 2006/0078053 A1 | 4/2006 | Park et al. | |
| 2006/0215766 A1 | 9/2006 | Wang et al. | |
| 2006/0215776 A1 | 9/2006 | Wu et al. | |
| 2006/0239354 A1 | 10/2006 | Amano et al. | |
| 2007/0019724 A1* | 1/2007 | Tourapis et al. | 375/240.12 |
| 2007/0160137 A1 | 7/2007 | Guo et al. | |
| 2007/0171974 A1* | 7/2007 | Baik | 375/240.12 |
| 2007/0189623 A1 | 8/2007 | Ryu | |
| 2007/0195890 A1 | 8/2007 | Kim et al. | |
| 2008/0175439 A1* | 7/2008 | Kurata | 382/107 |
| 2008/0232463 A1 | 9/2008 | Lu et al. | |
| 2009/0147854 A1* | 6/2009 | Dane et al. | 375/240.16 |
| 2009/0190845 A1* | 7/2009 | Au et al. | 382/236 |
| 2010/0020884 A1* | 1/2010 | Pandit et al. | 375/240.25 |
| 2010/0284471 A1 | 11/2010 | Tsai et al. | |
| 2011/0051801 A1* | 3/2011 | Hwang et al. | 375/240.02 |

FOREIGN PATENT DOCUMENTS

| | | |
|---|---|---|
| JP | 2004056616 A | 2/2004 |
| JP | 2006246524 A | 9/2006 |
| JP | 2008541649 A | 11/2008 |
| KR | 20070011225 A | 1/2007 |
| KR | 20090081672 A | 7/2009 |
| WO | WO9934605 A1 | 7/1999 |
| WO | 2006042323 A2 | 4/2006 |
| WO | 2006123307 A2 | 11/2006 |
| WO | 2008085885 A2 | 7/2008 |

OTHER PUBLICATIONS

International Search Report and Written Opinion—PCT/US2010/034064, International Search Authority—European Patent Office—Jul. 14, 2010.

Wang: "Isolated Regions: Motivation, Problems, and Solutions,"ITU Study Group 16—Video Coding Experts Group—ISO/IEC MPEG & ITU-T VCEG (ISO/IEC JTC1/SC29/WG11 and ITU-T SG16 Q6), No. JVT-O072, May 10, 2002, XP030005181.

Truong Cong Thang et al: "SVC CE4: On signaling for ROI boundary handling" ITU Study Group 16—Video Coding Experts Group—ISO/IEC MPEG & ITU-T VCEG(IS0/IEC JTC1/SC29/WG11 and ITU-T SG16 Q6), XX, XX, No. M12917, Jan. 11, 2006, XP030041586.

Yang Liu et al., "Region-of-Interest Based Resource Allocation for Conversational Video Communication of H.264/AVC", 2008,IEEE Transactions on Circuits and Systems for Video Technology, Vol. 18, No. 1, pp. 134-139.

Taiwan Search Report—TW099114728—TIPO—Mar. 13, 2014.

* cited by examiner

VIDEO ENCODING WITH TEMPORALLY CONSTRAINED SPATIAL DEPENDENCY FOR LOCALIZED DECODING

This application is related to U.S. Patent Application filed on the same date as the present application, entitled "VIDEO DECODING USING TEMPORALLY CONSTRAINED SPATIAL DEPENDENCY," temporarily referenced by Attorney Docket No. IDF 081990U2, which is assigned to the assigner hereof and hereby expressly incorporated by reference in its entirety for all purposes.

TECHNICAL FIELD

The disclosure relates to video coding and in particular, techniques for region-of-interest (ROI) processing of coded video.

BACKGROUND

Digital video capabilities are provided in a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in various standards including MPEG-2, MPEG-4, or ITU-T H.264/MPEG-4, Part 10, Advanced Video Coding (AVC). Video compression techniques may perform spatial prediction and temporal prediction to reduce redundancy, and communicate digital video more efficiently.

Region-of-interest (ROI) processing may involve recording or coding one or more selected regions of a video frame differently than other regions. As an example, an ROI may be preferentially encoded with higher quality than other, non-ROI regions. With preferential encoding of the ROI, a user may be able to view the ROI more clearly than non-ROI regions. As another example, zooming panning may be performed at the time of video recording to enhance the visibility or quality of an ROI within a recorded video scene. In each case, the ROI is established at the video recording or encoding stage, and then viewed upon decoding and displaying a given video frame.

SUMMARY

In general, this disclosure describes video coding techniques that constrain temporal propagation of spatial dependencies of encoded video blocks to support localized decoding in a video frame. Temporal propagation of spatial dependency over a series of reference frames can impact the ability of a decoder to perform localized decoding within a frame. For example, localized decoding of an ROI of a video frame may require the availability of decoded reference blocks that reside outside of the ROI. By constraining temporal propagation of spatial dependencies, a video encoder may reduce or eliminate the need for a decoder to access decoded reference blocks outside of the ROI.

The techniques may track temporal spatial dependency values for individual video blocks that have been encoded. Encoded video blocks may serve as candidate reference blocks for predictive coding of other video blocks in a frame to be encoded. When encoding a current video block, an encoder identifies a set of candidate reference blocks, and determines whether the temporal spatial dependency values of the candidate reference blocks exceed a temporal spatial dependency limit. If so, the encoder may force the current video block to be intra-coded, instead of inter-coded, thereby limiting the temporal range of spatial dependency, and supporting localized, ROI-only decoding.

The disclosure also provides techniques for decoding video blocks. Based on a ROI selection by the user or by an application, a video decoder may access decoded blocks within the ROI from previous frames. In one example, by embedding block position lookup tables in a UserData field supported by all video coder-decoders ("codecs"), a decoder may randomly access blocks for decoding.

In one example, the disclosure provides a method for determining a coding mode in a video encoder comprising determining a temporal spatial dependency value for a candidate reference video block for inter-coding a current block in a video frame. The method further comprises comparing the temporal spatial dependency value to a threshold value. The method further comprises selecting a coding mode for the current block based on the comparison.

In another example, the disclosure provides a video encoding device comprising a storage device that stores a temporal spatial dependency value for a candidate reference block for coding a current block in a video frame, and a video encoder that determines the temporal spatial dependency value for the candidate reference video block, compares the temporal spatial dependency value to a threshold value, and selects a coding mode for the current block based on the comparison.

In an additional example, the disclosure provides a computer-readable medium comprising instructions encoded on the computer-readable medium that, upon execution, cause a processor within a video encoder to determine a temporal spatial dependency value for a candidate reference video block for inter-coding a current block in a video frame. The computer-readable medium further comprises instructions that cause the processor to compare the temporal spatial dependency value to a threshold value. The computer-readable medium further comprises instructions that cause the processor to select a coding mode for the current block based on the comparison.

In another example, the disclosure provides a video encoding device comprising means for determining a temporal spatial dependency value for a candidate reference video block for inter-coding a current block in a video frame. The encoder further comprises means for comparing the temporal spatial dependency value to a threshold value. The encoder further comprises means for selecting a coding mode for the current block based on the comparison.

In an additional example, the disclosure provides a method performed in a video decoder. The method comprises receiving data defining a region-of-interest (ROI) of a video frame, receiving a temporal spatial dependency value (TSD) for at least one video block in the ROI, and decoding a video block in the ROI based at least in part on the TSD value.

In another example, the disclosure provides a video decoder comprising a region-of-interest (ROI) selection unit that selects a ROI of a video frame, a unit that receives a temporal spatial dependency value for at least one video block in the ROI, and a unit that decodes a video block in the ROI based at least in part on the TSD value.

In an additional example, the disclosure provides a computer-readable medium comprising instructions encoded on the computer-readable medium that, upon execution, cause a processor within a video decoder to receive data defining a region-of-interest (ROI) of a video frame, receive a temporal spatial dependency (TSD) value for at least one video block in the ROI, and decode a video block in the ROI based at least in part on the TSD value.

In another example, the disclosure provides a video decoder comprising means for receiving data defining a region-of-interest (ROI) of a video frame, means for receiving a temporal spatial dependency (TSD) value for at least one video block in the ROI, and means for decoding a video block in the ROI based at least in part on the TSD value.

The details of one or more examples are set forth in the accompanying drawings and the description below. Other features, objects, and advantages will be apparent from the description and drawings, and from the claims.

DETAILED DESCRIPTION

Figure 1:
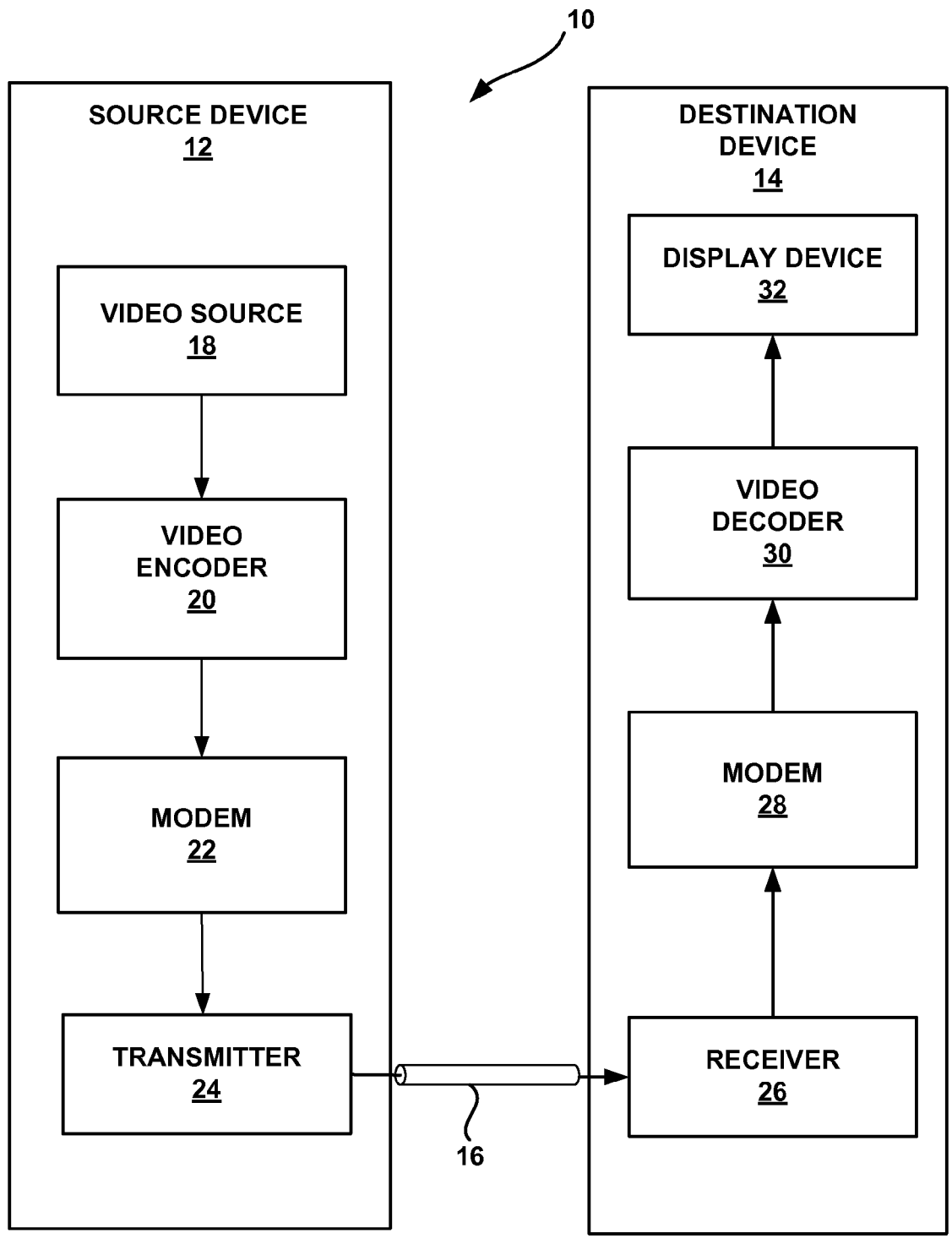
FIG. 1 is a block diagram illustrating a video encoding and decoding system.

Region-of-interest (ROI) definition for video coding ordinarily takes place at the time of video recording, such as in video camcorders. For example, a user may zoom or pan within a video scene to record video of an ROI in a scene. The recorded video is then encoded for storage and/or communication for decoding and playback. Video playback typically reproduces faithfully the video that was recorded, providing a uniform viewing experience for the video among different viewers and among different viewings of the same video. In other words, the viewing experience is assumed to be substantially the same for every viewer.

Uniform viewing may be acceptable for many applications, such as when the display capability of a device closely matches the bandwidth of video transmission or storage, and the resolution or size of the video frame. In some cases, however, it may be desirable to permit a viewer to define the ROI at the decoder side for video playback. For example, a viewer may wish to locally define an ROI at the decoder side to obtain a unique or distinctive view of a scene captured by encoded video, e.g., by zooming or panning within the video scene.

Localized decoding to support decoder-side ROI definition may be generally desirable for any device, but especially desirable for devices having limited bandwidth, processing or display capabilities, such as size and resolution. Examples include mobile, hand-held devices with small display screens, limited processing resources, and/or limited bandwidth connections, such as wireless connections. With reduced display capabilities, users of mobile device may be less interested in viewing the entire captured scene, and instead may be more interested in viewing enlarged portions of the captured scene.

ROI zooming and panning may be readily performed for static content, such as viewing of text or still images. For example, touch screen devices may allow a user to zoom in on an ROI using finger movement. Other pointing devices may be used to achieve similar results. With static content, ROI zooming and panning may be accomplished by simply selecting and manipulating a portion of the still image to be presented on the display. In this case, device memory typically stores the entire image frame, making ROI zooming and panning straightforward.

For dynamic content, such as video, decoding video blocks of predictively encoded frames requires access to reference blocks in previously decoded frames. Typical video encoders assume that decoding of each frame will be performed for the entire frame, such that all possible reference blocks (e.g., macroblocks) will be available for decoding of later frames. As a result, encoders and decoders are not configured to support an ROI-only decoding technique by which only a portion of a frame is decoded.

If only an ROI portion of a frame is decoded, reference blocks necessary to decode future frames may be unavailable because they were not decoded. It may not be possible to decode some blocks in future frames due to temporal spatial dependencies upon reference blocks that were outside the ROI in previous frames, and therefore not decoded. Alternatively, it may be necessary to decode non-ROI blocks in previous frames, even though such non-ROI blocks are not displayed, for the purpose of supporting decoding of ROI blocks in later frames, which may be inefficient and undesirable.

In general, this disclosure describes video encoding techniques that constrain temporal propagation of spatial dependencies of encoded video blocks to support localized decoding in a video frame. The techniques may track temporal spatial dependency values of individual video blocks that have been decoded. Temporal propagation of spatial dependency over a series of reference frames used for predictive encoding may undermine the ability of a decoder to perform localized decoding in a frame, e.g., for ROI-only decoding. As used throughout this disclosure, the temporal spatial dependency of a candidate block refers to the number of video blocks in previous video frames on which the candidate video block depends.

When encoding a current video block, a video encoder may identify a set of candidate reference blocks and determine whether the temporal spatial values of the candidate reference blocks exceed a temporal spatial dependency limit. If so, the video encoder may force the current video block to be intra-coded, instead of inter-coded, thereby limiting the temporal range of spatial dependency. The temporal spatial dependency limit can be fixed or variable as an implementation parameter to balance video quality and coding efficiency.

The video encoder ensures that decoding the block will not require a reference block that resides beyond a pre-determined range outside an ROI defined at the decoder side. In this manner, the video encoder can keep spatial dependency of individual blocks properly localized so that continuous decoding can be properly localized.

FIG. 1 is a block diagram illustrating a video encoding and decoding system 10. As shown in FIG. 1, system 10 may include a source device 12 that transmits encoded video to a destination device 14 via a communication channel 16. Source device 12 may include a video source 18, video encoder 20, modulator/demodulator (modem) 22, and a transmitter 24. In some examples, source device 12 may be considered a video encoding device. In some aspects, transmitter 24 may be a wireless transmitter. Destination device 14 may include a receiver 26, modem 28, video decoder 30, and video display device 32. In some examples, destination device may be considered a video decoding device. In some aspects, receiver 26 may be a wireless receiver, such as a wireless receiver in a wireless communication device handset. In accordance with this disclosure, video encoder 20 of source device 12 may be configured to track, frame-by-frame, in a sequence of video frames, the spatial dependency of each block of a video frame to be encoded. Video encoder 20 may force intra-coding of a block when necessary in order to keep the temporal propagation of spatial dependency contained to a localized region, and thereby support decodability of the block if video decoder 30 is configured to support localized, ROI-only decoding.

The illustrated system 10 is merely exemplary. The techniques of this disclosure, in some aspects, may be performed by any encoding device that supports inter-coding and intra-coding techniques. Source device 12 is merely one example of such an encoding device. In other aspects, techniques described in this disclosure may be performed by a decoding device. For example, the decoding device may be configured to support localized decoding of a video frame, e.g., for ROI-only decoding.

In accordance with this disclosure, and as described in more detail below, video encoder 20 may store the temporal spatial dependency for each block of a video frame that is encoded. As an example, video encoder 20 may maintain information that indicates the number of frames on which each block in a frame depends for inter-coding. The temporal spatial dependency information may be stored in a database, lookup table, linked list, hash table, tree, binary tree, or any other type of data structure in a storage device such memory. A current block to be encoded may be dependent on a block in a previous frame in the sense that the block in the previous frame may serve as a reference or "predictive" block for inter-coding of the current block. This dependency may be spatial in the sense that a number of blocks within a spatial range of the current block may be candidates for use as predictive blocks. In some cases, the current block may be dependent on a block in one of a plurality of possible reference frames, when multiple reference frames are used, e.g., in the case of H.264 coding.

Frames are presented in a temporal order. For inter-coding, a current block to be encoded in a current frame, e.g., frame N, may be spatially dependent on a first reference block in one or more previous frames, e.g., frames N−1, N−2, N−3, N−4, etc. In turn, the first reference block may be spatially dependent on a second reference block in a different frame, the second reference block in another frame may be spatially dependent on a third reference block in yet another frame, and so forth. Temporal propagation of spatial dependency is a function of the temporal range between the current frame and the earliest frame used to inter-code any of the reference blocks necessary to encode the current block. As an example, if an encoded block in frame N is dependent for inter-coding on a reference block in frame N−1, the reference block in frame N−1 is dependent for inter-coding on another reference block in frame N−2, but the reference block in frame N−2 is intra-coded, then the temporal spatial dependency value for the block in frame N is 2.

Hence, the number of blocks in previous video frames on which the candidate reference video block depends defines a temporal spatial dependency value. In deciding whether to encode the block using inter-coding mode or intra-coding mode, the video encoder 20 may query the database and compare the temporal spatial dependency values of each of a set of candidate reference blocks to a threshold value. The candidate reference blocks may be blocks in previously encoded frames that reside spatially within a motion estimation search range of the block to be encoded. If the temporal spatial dependency values of all of the candidate reference blocks exceed the threshold value, then video encoder 20 selects intra-coding as the coding mode for the current block, thereby limiting temporal propagation of spatial dependency for the current block. If the temporal spatial dependency value of at least one block does not exceed the threshold value, then video encoder 20 does not force intra-coding, and makes a mode decision for the block based on other factors such as intra-refresh (IR) rate, coding distortion indicated by motion compensation, and/or available coding bit rate.

In general, source device 12 generates coded video data for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video playback, video broadcasting, or video telephony. In other cases, video device 14 may be configured to simply receive video broadcasting or video streaming or otherwise support video playback.

Video source 18 of source device 12 may include a video capture device, such as a video camera, a video archive containing previously captured video, or a video feed from a video content provider. As a further alternative, video source 18 may generate computer graphics-based data as the source video, or a combination of live video, archived video, and computer-generated video. In some cases, if video source 18 includes a video camera, source device 12 and destination device 14 may form so-called camera phones or video phones. In each case, the captured, pre-captured, or computer-generated video may be encoded by video encoder 20. In other cases, source device 12 may be a video streaming or video broadcasting device. The encoded video may be modulated by modem 22 according to a communication standard, e.g., such as code division multiple access (CDMA) or another communication standard or technique, and transmitted to destination device 14 via transmitter 24.

Receiver 26 of destination device 14 receives information over channel 16, and modem 28 demodulates the received information. The decoding process performed by video decoder 30, like the encoding process, uses the techniques of this disclosure in order to support improved levels of data compression. Decoder 30 may support localized, ROI-only decoding of video data received from source device 12. The localized, ROI-only decoding may be supported by the constraints on temporal propagation of spatial dependency applied by encoder 20. Destination device 14 may accept user input that defines a desired ROI, and then direct video decoder 30 to perform localized decoding of blocks corresponding to the ROI. Decoder 30 may avoid decoding blocks that are outside of the ROI, and may discard data corresponding to such blocks. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14.

Video encoder 20 and video decoder 30 may operate according to various video compression standards including the ITU-T H.264 standard, alternatively referred to as MPEG-4, Part 10, Advanced Video Coding (AVC), as well as those standards defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU H.264/MPEG-4 Part 10 AVC standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/AVC.

Video encoder 20 and video decoder 30 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective digital video device, such as a mobile device, subscriber device, broadcast device, server, or the like.

A video sequence includes a series of video frames. In some cases, a video sequence can be arranged as a group of pictures (GOP). Video encoder 20 operates on video blocks within individual video frames in order to encode the video data. The video blocks may have fixed or varying sizes, and may differ in size according to a specified coding standard. Each video frame may include a series of slices. Each slice may include a series of macroblocks, which may be arranged into even smaller blocks. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the term video block may refer to a block of pixels in a video frame, and may be a macroblock or a smaller or larger block.

Figure 2:
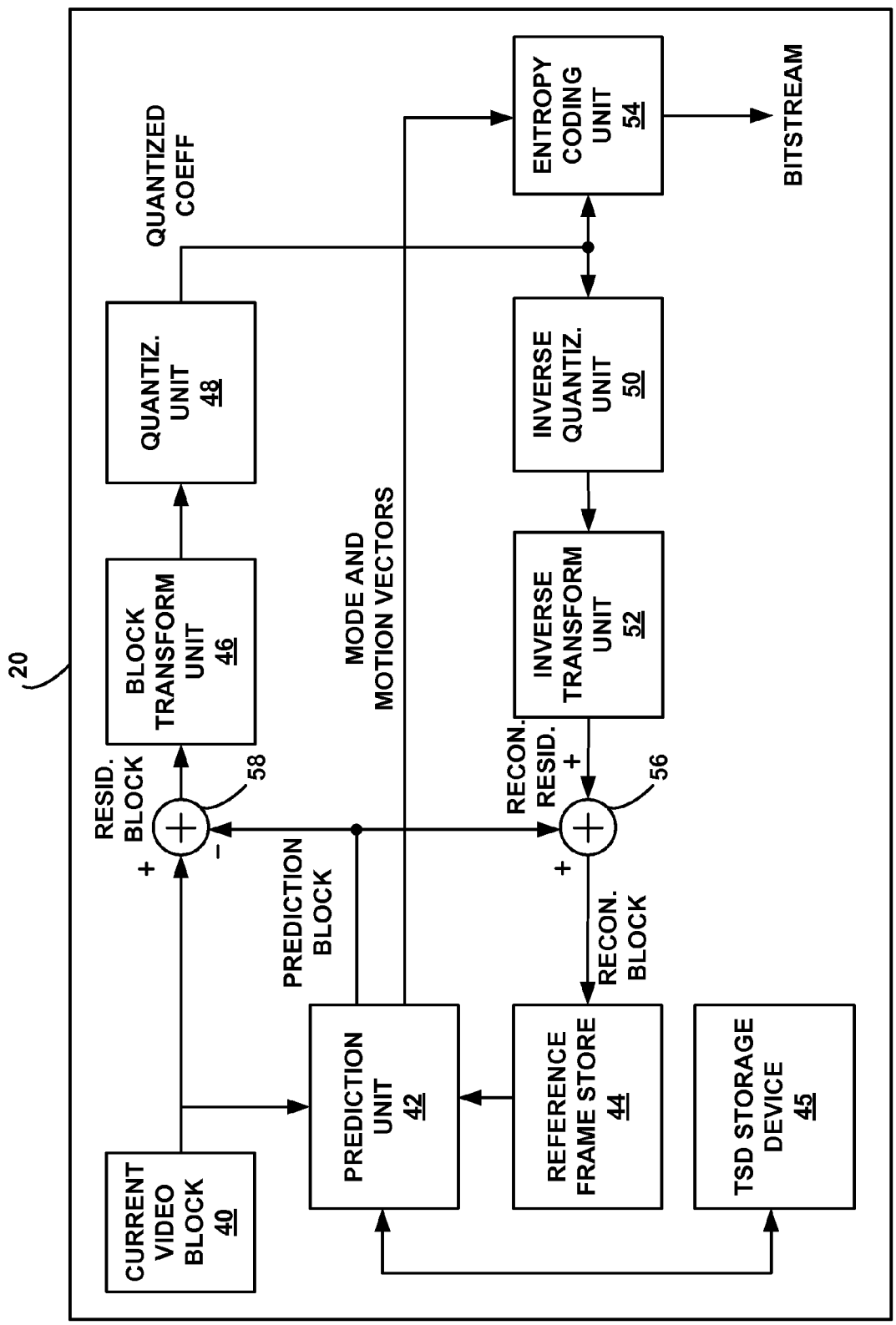
FIG. 2 is a block diagram illustrating an exemplary video encoder in accordance with this disclosure.

FIG. 2 is a block diagram illustrating an example of a video encoder 20 that includes a prediction unit 42 that performs techniques of this disclosure to select a coding mode (i.e., intra or inter) based on the temporal spatial dependency (TSD) value of the candidate reference blocks that would be used to encode the current video block. For each video block to be encoded, video encoder 20 determines a TSD of a candidate video block. That is, for each block of a video frame, the encoder maintains the temporal spatial dependency value of the one or more video blocks in one or more previous video frames on which the candidate reference video block depends. The encoder may maintain this dependency in a TSD storage device, for example.

As shown in FIG. 2, video encoder 20 receives a current video block 40 within a video frame to be encoded. In the example of FIG. 2, video encoder 20 includes prediction unit 42, reference frame store 44, temporal spatial dependency (TSD) storage device 45, block transform unit 46, quantization unit 48, inverse quantization unit 50, inverse transform unit 52, and entropy encoding unit 54. A deblocking filter (not shown) may also be included to filter block boundaries to remove blockiness artifacts. Video encoder 20 also includes summer 56 and summer 58.

For inter-coding, prediction unit 42 compares the current video block 40 to be encoded to various candidate reference blocks in one or more video reference frames. For intra-coding, prediction unit 42 predicts the video block to be encoded from already coded neighboring video blocks of the same coded frame. The predicted data may be retrieved from reference frame store 44, which may comprise any type of memory or data storage device to store video blocks reconstructed from previously encoded blocks. Prediction unit 42 may generate prediction modes and motion vectors, which comprise syntax elements that may be used to identify the prediction blocks used to code the current video block. For intra-coding, prediction unit 42 may comprise a spatial prediction unit. For inter-coding, prediction unit 42 may include motion estimation and motion compensation units, as shown and described in more detail below with respect to FIG. 4.

Prediction unit 42 further comprises a mode select unit (not shown in FIG. 2). The mode select unit of prediction unit 42 selects either inter-coding or intra-coding on either a frame level or block level. Described in greater detail below with regard to FIG. 4 and consistent with the techniques of this disclosure, the mode select unit may select intra-coding to encode a current block if the temporal spatial dependency values of all of the candidate reference blocks for coding the current block exceeds a threshold value, and may select inter-coding, depending on other factors as described below, to encode a block if the temporal spatial dependency value of the block does not exceed the threshold value. Alternatively, instead of comparing the TSD value of all of the candidate reference blocks against the threshold value, the TSD value for each candidate reference block may be added to the one additional dependency that would result from inter-coding with the current block and then that sum may be compared to the threshold value. In some cases, however, even if inter-coding would be selected on the basis of temporal spatial dependency, the mode select unit may select intra-coding based on other considerations such as IR rate, distortion or available bit rate.

Video encoder 20 forms a residual video block by subtracting the prediction block produced by prediction unit 42 from the original (current) video block being encoded. The prediction block is the candidate reference block that is actually selected for inter-coding of the current block. The prediction block may be selected, assuming it satisfies the temporal spatial dependency limit, as the candidate reference block that most closely matches the block to be encoded. Summer 58 represents a unit or module that performs this subtraction operation. Block transform unit 46 applies a transform, such as a discrete cosine transform (DCT) or a conceptually similar transform, to the residual block, producing a video block comprising residual transform block coefficients. Block transform unit 46, for example, may perform other transforms defined by the H.264 standard, which are conceptually similar to DCT.

Quantization unit 48 quantizes the residual transform coefficients to further reduce bit rate. Quantization unit 48, for example, may limit the number of bits used to code each of the coefficients. After quantization, a scan unit (not shown) scans the quantized coefficient block from a two-dimensional representation to a one-dimensional vector. Then, following this scanning process, entropy encoding unit 54 encodes the quantized transform coefficients according to an entropy coding methodology, such as CAVLC or CABAC, to further compress the data.

Following the entropy coding by entropy encoding unit 54, the encoded video may be transmitted to another device or archived for later transmission or retrieval. Inverse quantization unit 50 and inverse transform unit 52 apply inverse quantization and inverse transformation, respectively, to reconstruct the residual block in the pixel domain. Summer 56 adds the reconstructed residual block to the prediction block produced by prediction unit 42 to produce a reconstructed video block for storage in reference frame store 44. If desired, the reconstructed video block may also go through a deblocking filter unit (not shown) before being stored in reference frame store 44. The reconstructed video block may be used by prediction unit 42 as a reference block to inter-code a block in a subsequent video frame or to intra-code a future neighboring block within the same coded unit.

Figure 3:
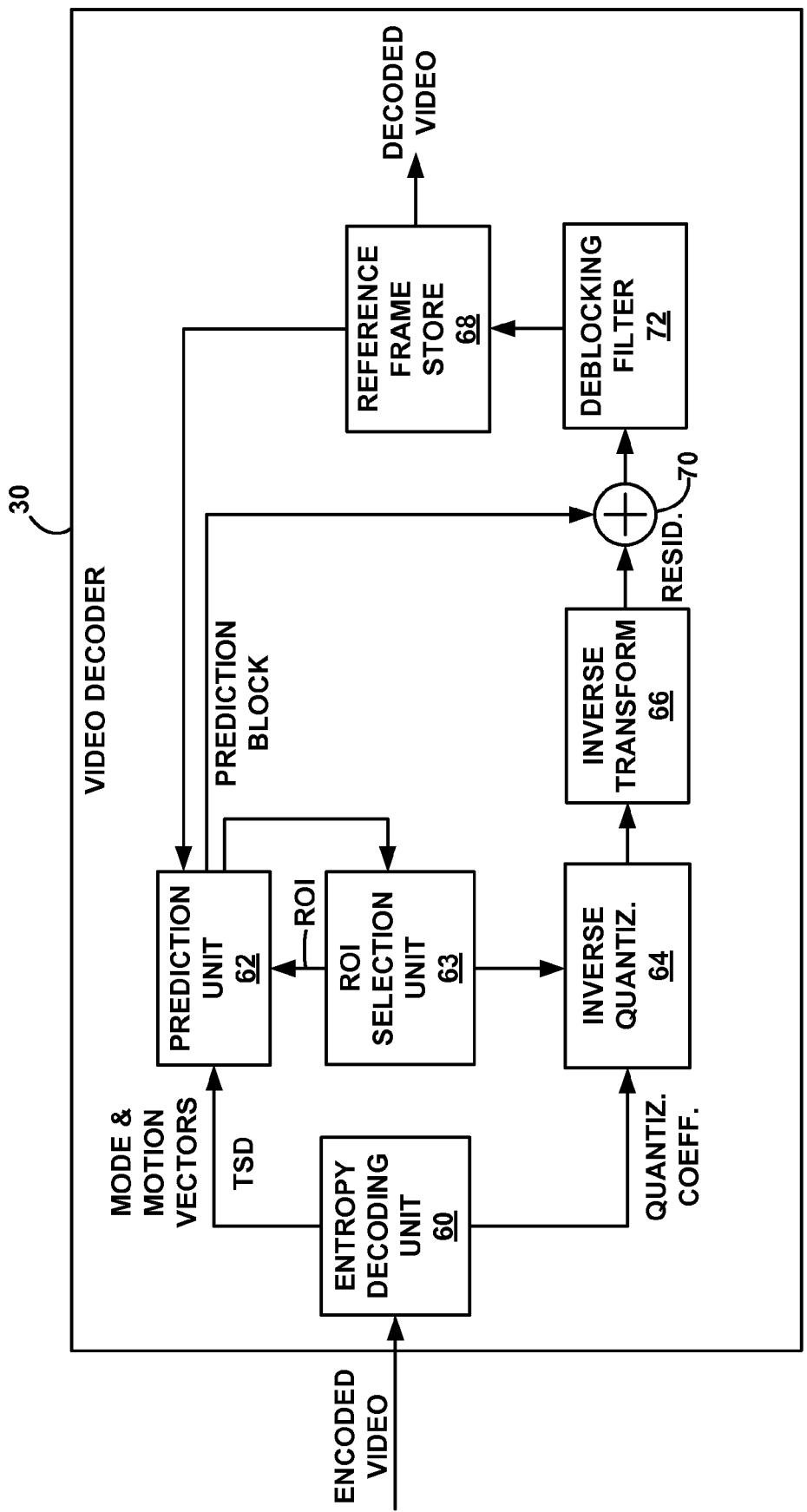
FIG. 3 is a block diagram illustrating an exemplary video decoder in accordance with this disclosure.

FIG. 3 is a block diagram illustrating an example of a video decoder 30, which decodes a video sequence that is encoded in the manner described herein. Video decoder 30 includes an entropy decoding unit 60 that performs the reciprocal decoding function of the encoding performed by entropy encoding unit 54 of FIG. 2. Video decoder 30 further includes an ROI selection unit 63. ROI selection unit 63 defines the ROI based on user input or application commands and concentrates the decoding on a particular region. Portions of the frame not defined within the ROI are not decoded. If a zoom function is to be performed, in order to fill the display of the device, upscaling of resolution by interpolation may be used. Such upscaling may be accomplished in the pixel domain after decoding.

Video decoder 30 may perform intra- and inter-decoding of blocks within video frames. In the example of FIG. 3, video decoder 30 also includes a prediction unit 62, an inverse quantization unit 64, an inverse transform unit 66, and reference frame store 68. Video decoder 30 also includes summer 70. Optionally, video decoder 30 may also include a deblocking filter 72 that filters the output of summer 70.

For intra-coding, prediction unit 62 may comprise a spatial prediction unit, while for inter-coding, prediction unit 62 may comprise a motion compensation unit. Inverse quantization unit 64 performs inverse quantization, and inverse transform unit 66 performs inverse transforms to change the coefficients of the video blocks back to the pixel domain. Summer 70 combines a prediction block from unit 62 with the reconstructed residual block from inverse transform unit 66 to generate a reconstructed block, which is stored in reference frame store 68. If desired, the reconstructed video block may also go through a deblocking filter unit 72 before being stored in reference frame store 68. Decoded video is output from reference frame store 68, and may also be fed back to prediction unit 62 for use in subsequent predictions.

Using the techniques described in this disclosure, the encoded video entering video decoder 30 is constructed so that the temporal propagation of spatial dependencies can constrained. As a result, video decoder 30 may operate in a continuous decoding mode using previously decoded ROI blocks without having to exit the coding loop and decode non-ROI blocks that are used for no other purpose than to decode blocks with large temporal spatial dependency. Although the video decoder may exit the coding loop and decode certain non-ROI blocks stored within a reference frame store, it is not as efficient as the continuous decoding mode.

Figure 4:
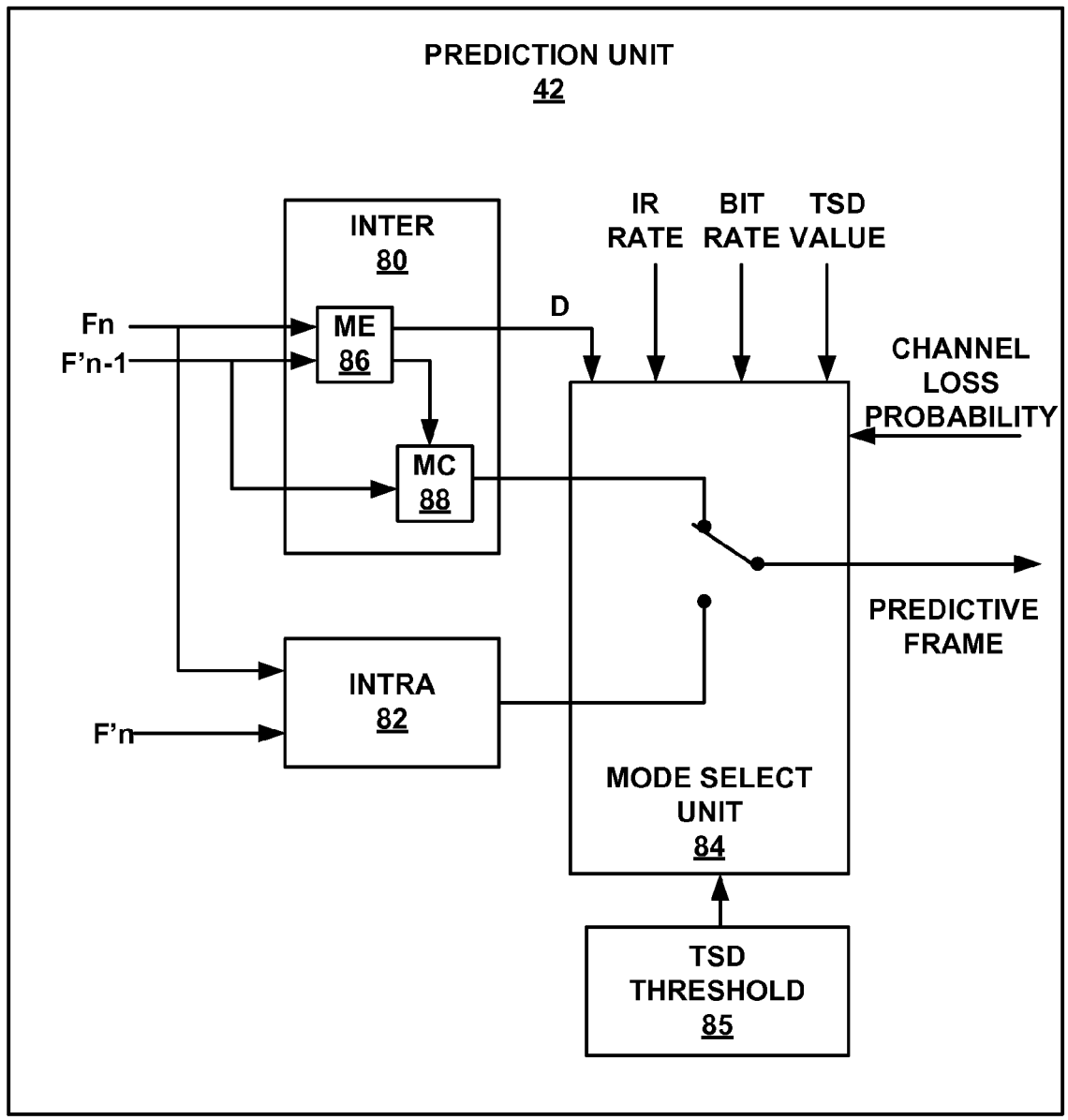
FIG. 4 is a block diagram illustrating an exemplary prediction unit in accordance with this disclosure.

FIG. 4 is a block diagram illustrating an example of a prediction unit 42. As shown in FIG. 4, prediction unit 42 includes inter-coder (INTER) 80, intra-coder (INTRA) 82, and mode select unit 84. The inter- or intra-prediction frame ("Predictive Frame") is obtained from either inter-coder 80 or intra-coder 82. Inter-coder 80 performs inter-coding of incoming frame Fn, e.g., according to the MPEG-4 or H.264 compression method. As shown in FIG. 4, inter-coder 80 includes a motion estimation (ME) unit 86 and motion compensation (MC) unit 88 to support standard inter-coding of the incoming frame Fn relative to previously encoded frame F'n−1, or previously encoded frames F'n−2, F'n−3 . . . F'n−x. In particular, an inter prediction is formed by motion-compensated prediction from one or more previous frames F'n−x. Previous frames F'n−2, F'n−3 . . . F'n−x may be previously encoded and reconstructed to produce F'n−1.

Intra-coder 82 performs intra-coding of the incoming video frame Fn to produce an intra prediction. The intra prediction is formed from samples in the current frame Fn that have been previously encoded, decoded and reconstructed to form reconstructed frame F'n. The resulting intra prediction is applied to summer 58 shown in FIG. 2 when video encoder 20 is operating in intra-mode. Intra-coder 82 may perform intra-coding to generate I frames, or intra-code selected video blocks within a P frame to support intra-refreshing (IR).

A mode select unit 84 selectively switches between inter-coding and intra-coding, e.g., on a frame-by-frame or block-by-block basis. In particular, mode select unit 84 selects either the output of inter-coder 80 or intra-coder 82 on either a frame level or block level. In this manner, mode select unit 84 determines whether the prediction block applied to summer 58 of FIG. 2 will be Inter-coded or Intra-coded.

Mode select unit 84 may use one or more factors in deciding whether to use intra- or inter-coding on a block. For example, the mode select unit 84 may make a mode decision based on the available bit rate for coding, channel loss probability, distortion (D) and intra-refresh (IR) rate. In addition, in accordance with this disclosure, mode select unit 84 may use a temporal spatial dependency (TSD) value.

Intra-coding mode requires significantly more information, and consequently bits, to be encoded in comparison with inter-coding mode. Transmission of an intra-coded frame thus causes a large spike in the bit rate. Rather than intra-coding an entire frame, it may instead be desirable to distribute the intra-coding of the entire frame over several frames. That is, by intra-coding only some blocks of the current frame, and then intra-coding the remaining blocks in subsequent frames, the peak-to-average bit rate may be reduced. As such, the mode select unit 84 may take into account the desired bit rate and the available bandwidth in making a coding decision.

In addition to coding bit rate, in some examples, the mode select unit 84 may also use the probability of channel loss in order to make a coding decision. The estimated channel loss probability quantifies the likelihood that the current frame will be dropped when transmitted across channel 16. As the likelihood of channel loss increases, it may be more desirable to intra-code a frame or block.

Further, the mode select unit 84 may also use intra-refresh (IR) rate in order to make a coding decision. To limit propagation of channel-induced errors from one frame to another, a video encoder typically applies an IR technique. According to IR techniques, blocks within a predictive frame are selectively intra-coded, rather than inter-coded. Intra-coded blocks can improve error resilience, but require an increase in the number of bits that must be transmitted. Therefore, the IR rate impacts encoding performance in terms of both error resilience and bandwidth efficiency.

The IR rate generally determines the number of blocks that will be intra-refreshed, and may be applied at the frame level or block level. The IR rate may be determined based on video content, or a combination of video content and channel condition. For example, the IR rate may be determined based on a combined metric that measures estimated channel loss probability, frame-to-frame variation between a current frame and another frame, and texture information for the current frame. In general, if the IR rate indicates that a block should be intra-coded, mode select unit 84 may select the intra-coding mode without the need to evaluate the other factors.

As mentioned above, mode select unit 84 may make a coding mode decision based on a distortion calculation. Distortion is the error between the original block and the predictive block. If inter-coding a block results in a level of distortion that exceeds a distortion threshold, the mode select unit 84 may decide to use intra-coding to code the block. The distortion threshold is a function of the desired image quality.

In accordance with this disclosure, another factor that may be used by the mode select unit 84 to make a coding decision is the temporal spatial dependency (TSD) values of the candidate reference blocks available to inter-code the current video block. The temporal spatial dependency value of the candidate video block may be used by mode select unit 84 in deciding whether to code the block using inter- or intra-coding techniques. The temporal propagation of the spatial dependency of a video block, explained in more detail below with reference to FIGS. 5-7, may be tracked in a database that is, for example, accessible by mode select unit 84. The mode select unit compares the temporal spatial dependency value of the each candidate video block with a dependency threshold value 85, and depending on the result of the comparison, may decide to use intra-coding on the current block. The dependency threshold value 85 may be stored in a temporal spatial dependency threshold memory that is in communication with the mode select unit 84. It should be noted that even if mode select unit 84 decides not to use intra-coding on the current block based on the dependency threshold value, mode select unit 84 may select to use intra-coding on the current block based on other factors, such as the IR rate, coding bit rate, distortion, and channel loss probability.

Figure 5:
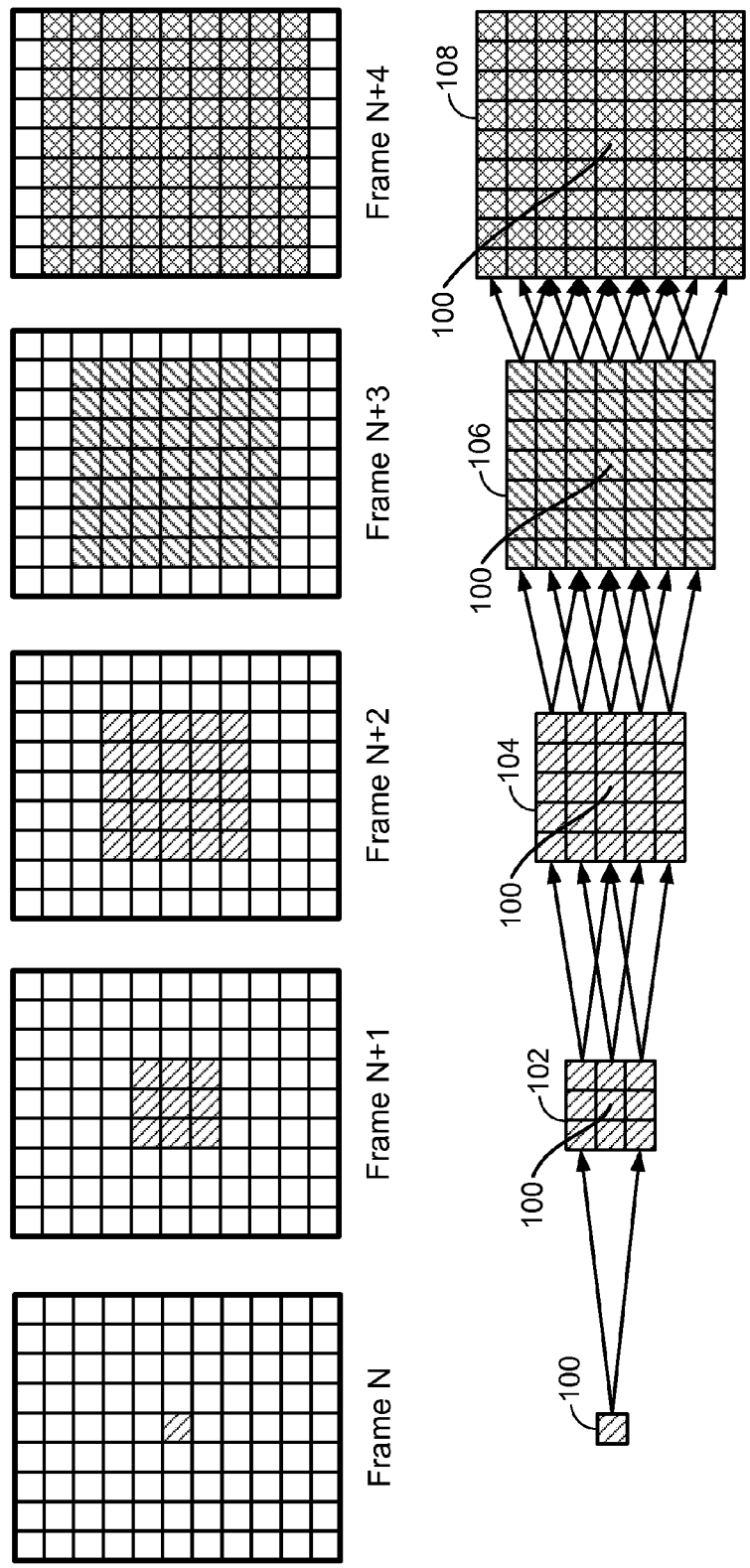
FIG. 5 is a diagram illustrating temporal propagation of spatial dependency in video encoding.

FIG. 5 is a diagram illustrating the temporal propagation of spatial dependency in video encoding. FIG. 5 illustrates an example video frame having a size of 9 by 11 blocks and encoded as a single slice. Any block of the current video frame can be used as a reference block for predictive encoding of a block in the same location (i.e. co-located) or immediately adjacent locations of the next frame. For example, frame N depicts a single encoded block, or center block 100. Encoded center block 100 in frame N may be used to predict any of the 3×3=9 immediately adjacent and co-located blocks in frame N+1, shown at 102. Subsequently, those 9 blocks in frame N+1 may be used to predict another group of immediately adjacent and co-located blocks in frame N+2, shown at 104, resulting in a 5×5=25 group of blocks that have been encoded based on block 100 in frame N. Similarly, the 25 blocks in frame N+2 shown at 104 may be used to predict another group of immediately adjacent and co-located blocks in frame N+3, shown at 106, resulting in a 7×7=49 group of blocks. Then, the 49 blocks in frame N+3 shown at 106 may be used to predict another group of immediately adjacent blocks in frame N+4, shown at 108, resulting in a 9×9=81 group of blocks that have been encoded based on block 100 in frame N. FIG. 5 thus shows the temporal (i.e., over multiple frames) propagation of spatial (i.e., adjacent blocks in the same frame) dependency in video encoding.

Figure 6:
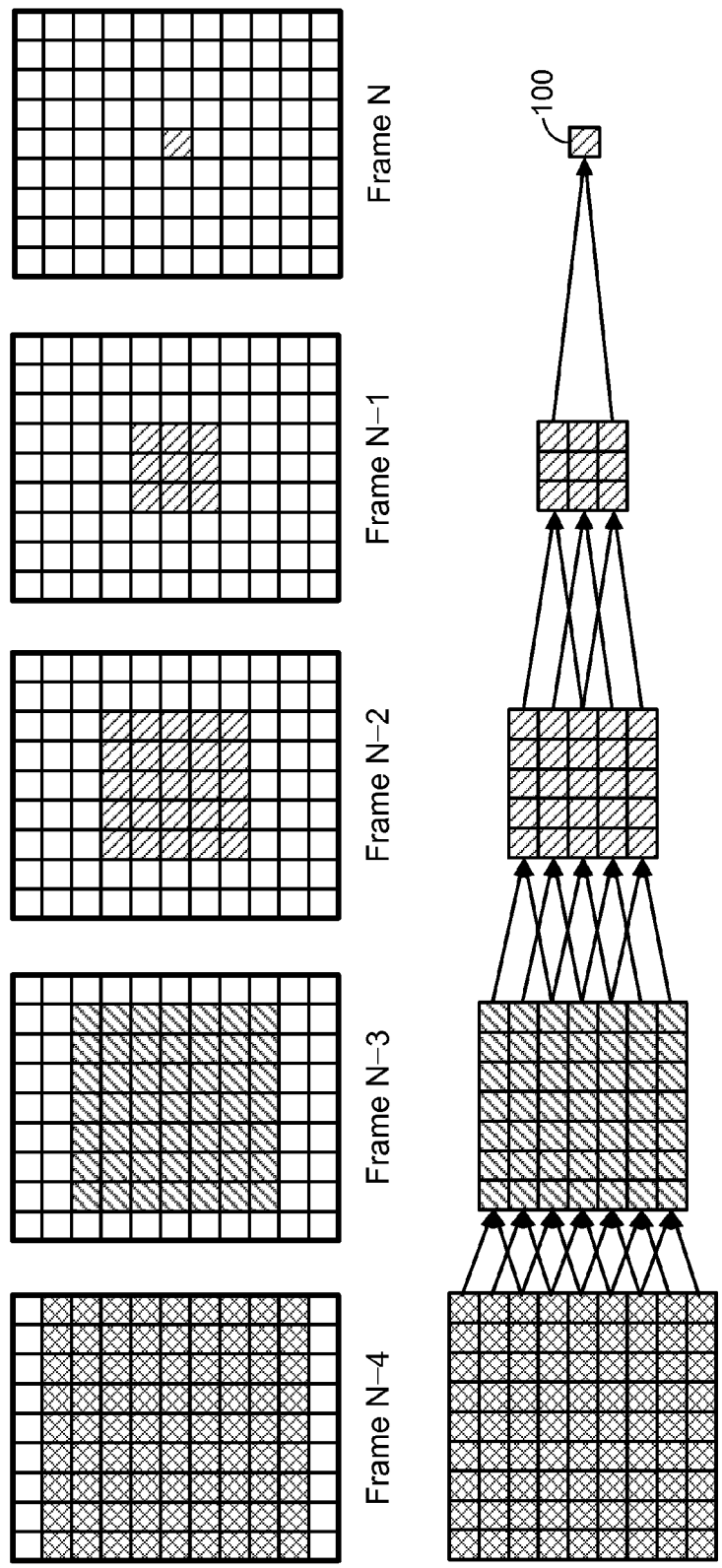
FIG. 6 is a diagram illustrating the temporal requirement of spatial dependency in video decoding.

The temporal, or inter-frame, propagation of spatial dependency of video blocks illustrated in FIG. 5 in a video encoding process imposes requirements on the video decoder. Specifically, the video decoder is required to have available to it past frames in order to decode a current frame. This is illustrated in FIG. 6. FIG. 6 is a diagram illustrating the temporal requirement of spatial dependency in video decoding. FIG. 6 is essentially the reverse of FIG. 5. As seen in FIG. 6, decoding the center block 100 of frame N may require that any of the 3×3=9 blocks shown in previous frame N−1 be available to the decoder. In order to be available to the decoder, the 9 blocks of previous frame N−1 may require that any of the 5×5=25 blocks in frame N−2 also be available to the decoder. And, the 25 blocks of frame N−3 may require that any of the 7×7=49 blocks in frame N−3 also be available to the decoder. Finally, the 49 blocks of frame N−3 may require that any of the 9×9=81 blocks in frame N−4 also be available to the decoder. Hence, the blocks in frame N−3 form possible candidate reference blocks for the blocks in frame N−2, the blocks in frame N−2 form possible candidate reference blocks for the blocks in frame N−1, and the blocks in frame N−1 form possible candidate reference blocks for the blocks in frame N, according to a motion estimation search range that considers adjacent blocks.

Figure 7:
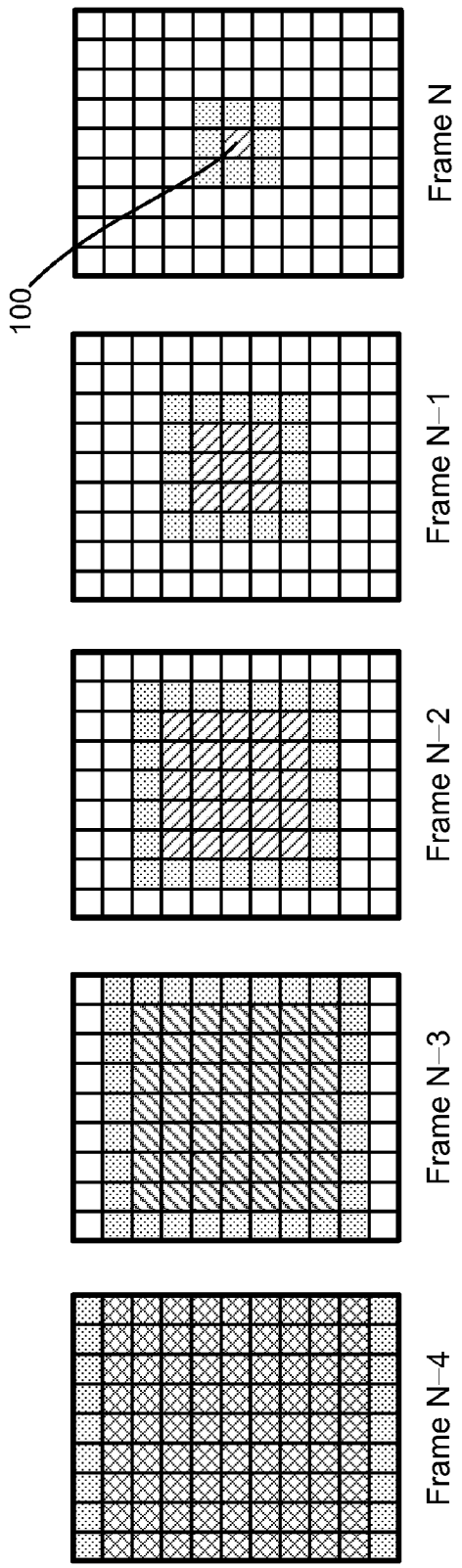
FIG. 7 is a diagram illustrating the temporal requirement of spatial dependency combined with intra-frame spatial dependency in video decoding.

The issue of inter-frame propagation of spatial dependency of video blocks may be further complicated by any intra-frame spatial dependency of the blocks, as seen in FIG. 7. FIG. 7 is a diagram illustrating the temporal requirement of spatial dependency shown in FIG. 6, combined with intra-frame spatial dependency, in video decoding. FIG. 7 shows that any of the eight blocks immediately adjacent the center block 100 in frame N may also be used for predictive decoding. Center block 100 may therefore be decoded using immediately adjacent blocks in the same frame (intra-frame spatial dependency) or using immediately adjacent or co-located blocks in previous frames (inter-frame spatial dependency). In reality, however, it is unlikely that all of the eight blocks would be used for decoding due to the order of block encoding.

FIGS. 5-7 illustrate that decoding of a few blocks over consecutive frames from encoded video cannot happen simply by decoding those blocks alone on a frame-by-frame basis. That is, it is not possible to continuously decode only a portion of the current frame using existing encoding methods. Rather, in order to decode only a portion of the current frame, the decoder ordinarily would need to have available to it the entire frame a few frames back in time.

Figure 8A:
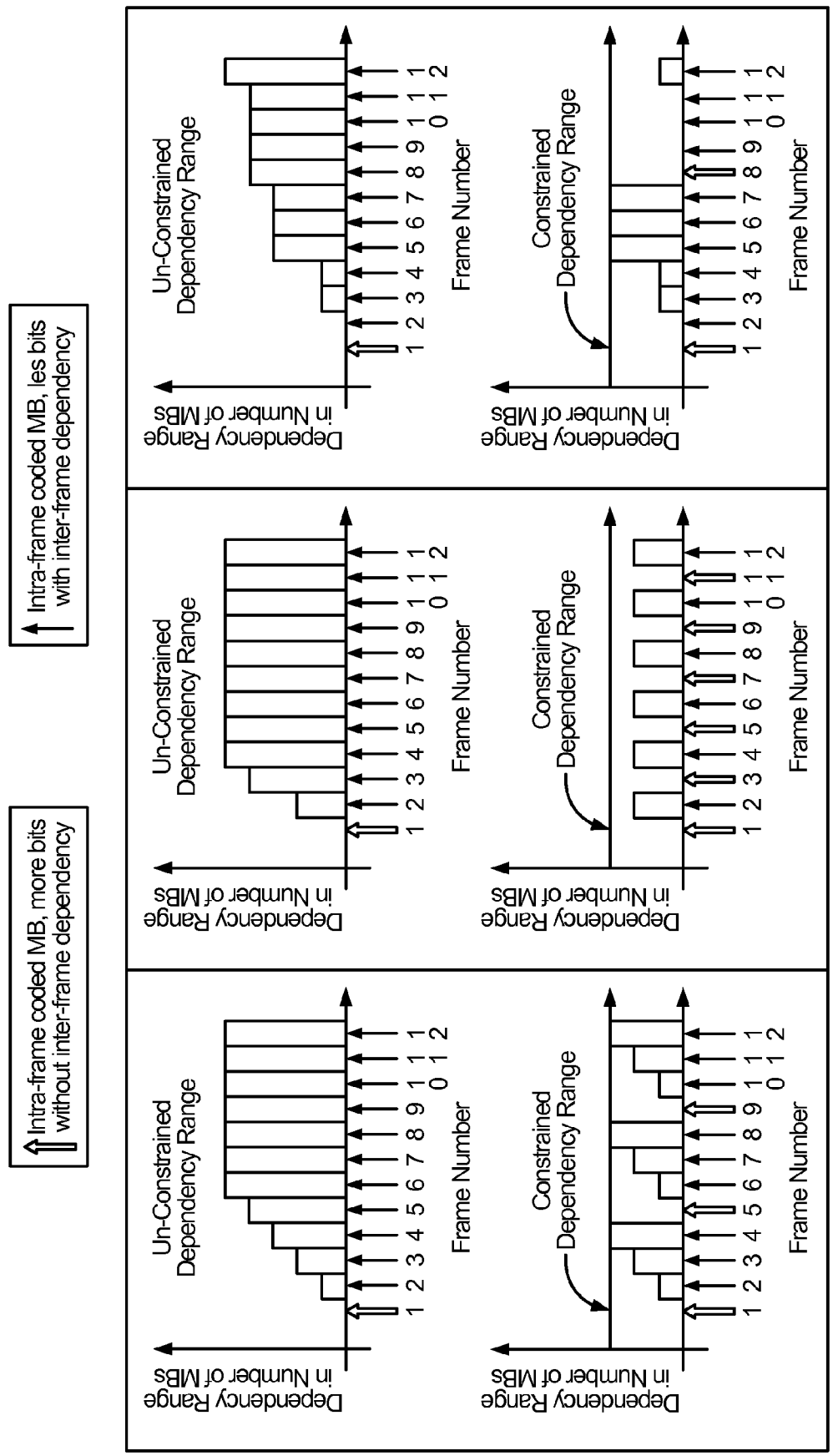
FIG. 8A is a diagram illustrating comparative graphs of video frames having an unconstrained dependency range and graphs of video frames having a constrained dependency range.

One example technique of the disclosure may reduce the effects of temporal propagation of spatial dependency by providing video encoders the ability to track the dependency of each encoded video block and constrain that dependency. FIG. 8A is a diagram illustrating comparative graphs of video frames having an unconstrained dependency range, as in traditional encoding techniques, and graphs of video frames having a constrained dependency range, as in one example of the disclosure.

FIG. 8A illustrates the concept of temporally constrained spatial dependency using three different cases (left, middle, and right) with three rates (linear, aggressive, and modest, respectively) of spatial dependency range propagation over consecutive frames. Both the bottom and top sets of graphs show how the dependency range in number of macroblocks (MBs) changes with respect to the frame number. In each graph, frame number 1 begins with an intra-coded MB. As such, all dependencies are reset such that the blocks in frame 1 do not depend from any previous frames. The top set of graphs show that with an unconstrained dependency range, the expansion of temporal spatial dependency eventually reaches the frame edge by frame number 6, 4, and 12, respectively. The bottom set of graphs depicts using intra-frame encoding whenever necessary to keep the spatial dependency constrained within a pre-determined range. In the left case in the bottom set of graphs, by frame number 4 the constrained dependency range has been reached. Therefore, intra-coding is performed thereby resetting the dependency range, as seen in frame 5. In the middle case in the bottom set of graphs, intra-coding is performed at frames 1, 3, 5, 7, 8, and 11. Because intra-coding is forced to be performed so frequently in this example, the dependency is not allowed to propagate even to the constrained dependency range, as shown by the dependency range in number of MBs never reaching the constrained dependency range as a result. It should be clear that a tighter dependency constraint results in more intra-frame encoding, thereby reducing the efficiency of the video coding. It should be noted that because the size of the ROI may not be known, it is necessary to select a fixed or variable pre-determined range, or TSD value, that is based on factors such as the size of the display device on the destination device, the desired efficiency of the encoder, and the amount of allowable image quality degradation, for example.

Figure 8B:
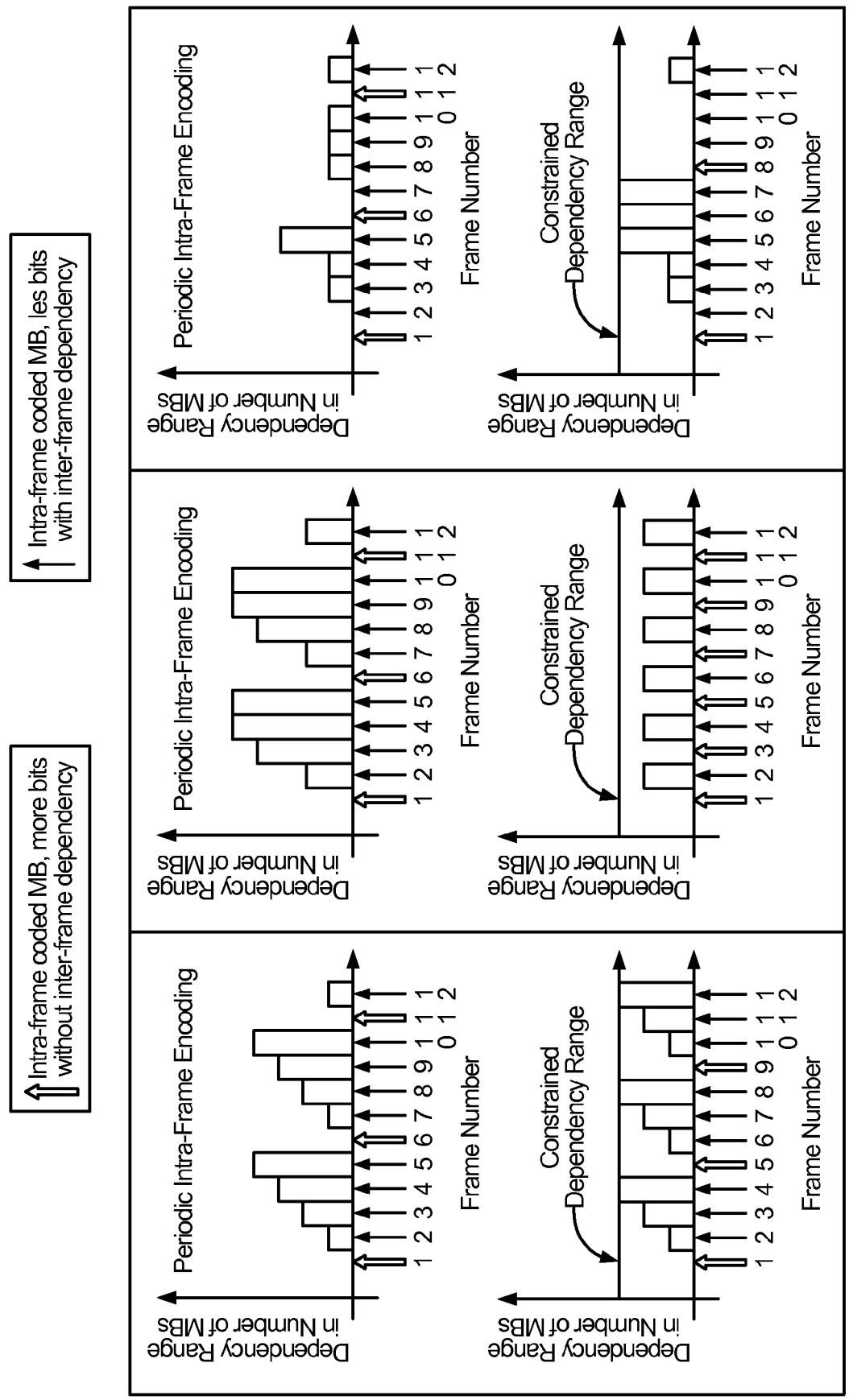
FIG. 8B is the diagram of FIG. 8A modified to include periodic intra-frame encoding.

FIG. 8B is similar to the diagram of FIG. 8A, depicting three different cases (left, middle, and right) with three rates (linear, aggressive, and modest, respectively) of spatial dependency range propagation over consecutive frames. Both the top and bottom sets of graphs show how the dependency range in number of macroblocks (MBs) changes with respect to the frame number. In each graph, frame number 1 begins with an intra-coded MB. As such, all dependencies are reset, as in FIG. 8A. However, in FIG. 8B, the graphs on the top have been modified to include the periodic intra-frame encoding that is typically required by traditional video encoders. For example, the graph on the left in the top set of graphs in FIG. 8B shows that intra-coding is performed at frames 6 and 11, thereby preventing expansion of temporal spatial dependency to the frame edge, but still resulting in frames with a higher dependency range in number of MBs than those that use the techniques described in this disclosure as shown in the graph on the left in the bottom set of graphs. The graph in the middle in the top set of graphs shows that with an aggressive rate, the expansion of temporal spatial dependency eventually reaches the frame edge in frames 4 and 5 before intra-coding is performed, and then again in frames 9 and 10 before intra-coding is again performed. Compared with video encoding with periodic intra-frame encoding of blocks, depending on the video content, the cost of additional intra-frame encoding for purposes of constraining spatial dependency may not be excessive.

Figure 9:
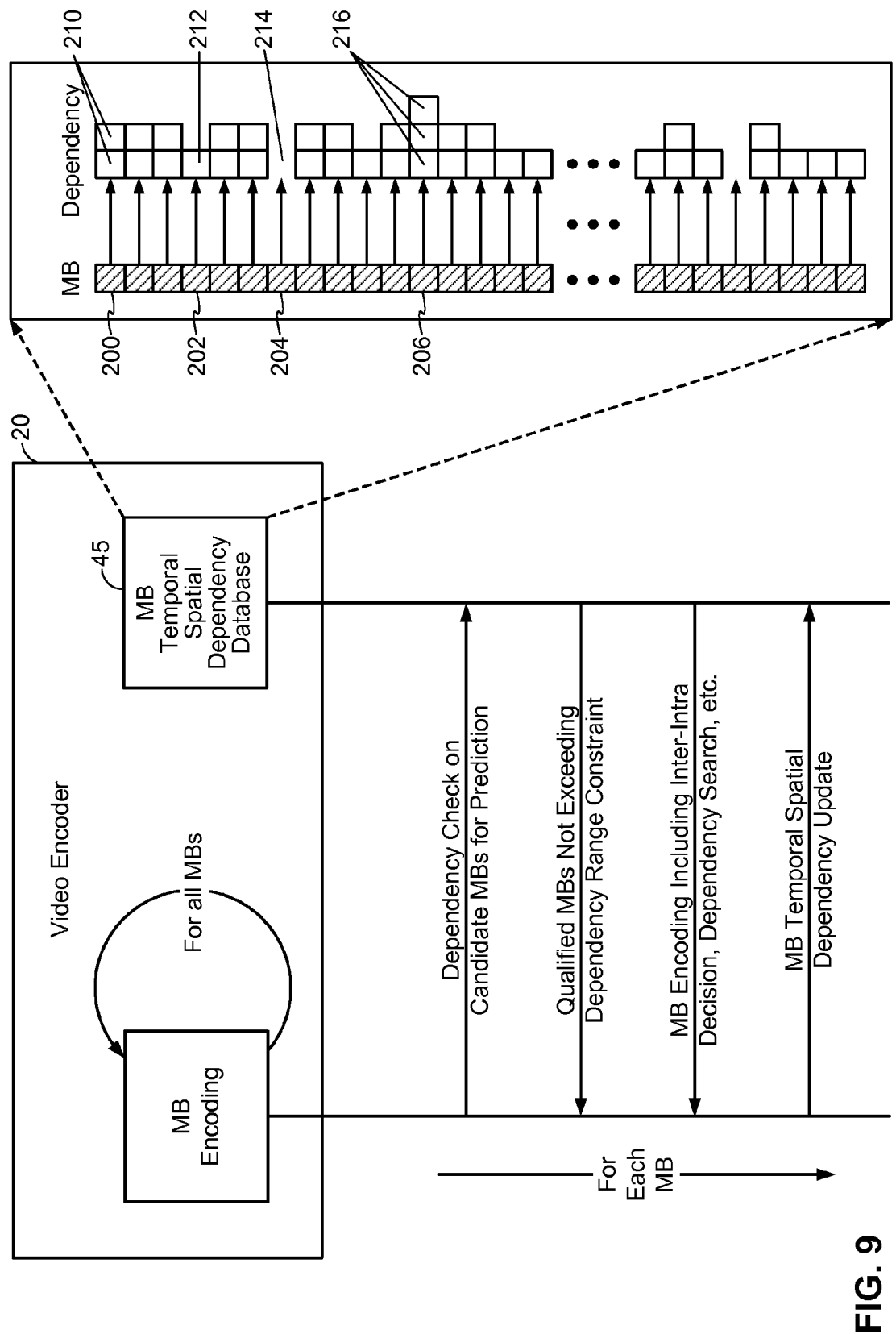
FIG. 9 is a diagram illustrating an exemplary video encoder architecture and operation for temporally constraining spatial dependency in accordance with this disclosure.

FIG. 9 is a diagram illustrating conceptually an exemplary video encoder architecture and operation for temporally constraining spatial dependency in accordance with this disclosure. FIG. 9 illustrates example functionality of video encoder 20 in temporally constraining spatial dependency. For all MBs to be encoded, the MB encoding loop of the video encoder 20 performs a dependency check on candidate MBs for prediction. In other words, for each video block to be encoded, video encoder 20 determines a temporal spatial dependency of a candidate video block. The encoder maintains the temporal spatial dependency value of the one or more video blocks in one or more previous video frames on which the candidate video block depends. The MB encoding loop performs the dependency check by accessing the MB temporal spatial dependency (TSD) database. As mentioned above, the temporal spatial dependency may be arranged in a database, lookup table, linked list, hash table, tree, binary tree, or any other type of data structure in a storage device such memory. The database looks up the candidate MBs and checks their respective dependencies. The number of video blocks in previous video frames on which the candidate video block in frame N depends defines a temporal spatial dependency value. Although the current video block only depends on one candidate block, the candidate block depends on another block, which may depend on another block, and so forth. The database returns the qualified MBs not exceeding the dependency range constraint. Then, the MB encoding loop decides whether to perform inter- or intra-coding, dependency search, etc. Finally, the MB encoding loop updates the MB TSD database. That is, the TSD database is updated with the new TSD value for all MBs that are encoded, allowing the encoder to retrieve the TSD value for that MB if that MB is later considered as a candidate reference MB for another MB. It should be noted that while FIG. 9 makes reference to macroblocks (MBs), the techniques described herein and with reference to FIG. 9 may be applied to video blocks in general, and are not restricted to use with macroblocks.

For purposes of explanation only, and without limitation, FIG. 9 graphically depicts that a block 200 in frame N−1, being considered as a candidate reference block for a block in frame N, is recorded in database 45 as depending on two blocks, shown at 210. The first of the two blocks 210 may be from the N−2 frame, and the second of the two blocks 210 may be from the N−3 frame, for example. Similarly, block 202 of the N−1 frame may depend on only one block, shown at 212, which may be from the N−2 frame. And, block 204 may not have any dependencies, as represented in FIG. 9 by the lack of blocks associated with it at 214. As a further example, block 206 may depend on three blocks, shown at 216. These three blocks may be from the N−2, N−3, and N−4 previously decoded frames, for example. In such a manner, the dependencies of each candidate reference block that may be used to inter-code the current frame is maintained by the encoder 20 in database 45 or by some data structure, array, collection of records, etc. And, based on the number of video blocks in previous video frames on which the candidate video block depends, a temporal spatial dependency value may be calculated.

Still referring to FIG. 9, video encoder 20 compares the temporal spatial dependency value of the candidate block to a temporal spatial dependency threshold value. In particular, video encoder 30 may, for a current block, access the database 45, retrieve the dependency of the candidate block or blocks, and compare the dependency of the candidate block against a temporal spatial dependency threshold value. For example, the temporal spatial dependency threshold value may have been predetermined to be two. So, if a candidate block depends on blocks in more than two previous frames, then the temporal spatial dependency of the candidate block is too high because the threshold value of two has been exceeded. Based on this comparison, the encoder 20 selects to intra-code the current video block. If, however, intra-coding is not selected, then the encoder 20 uses a "normal" coding mode decision. That is, the encoder decides whether to intra-code the current block based on the IR rate, distortion, coding bit rate, and channel loss probability. If the qualified MBs exceed the dependency range, or threshold value, then the encoder selects intra-coding. If the qualified MBs do not exceed the dependency range, or threshold value, the temporal spatial dependency is low enough to use inter-coding techniques on the block, subject to other factors. Examples of the comparison and selection are described immediately below.

The temporal spatial dependency database of FIG. 9 indicates that block 200 depends on blocks in two previous frames, block 202 depends on a block in one previous frame, block 204 has no dependency, and block 206 depends on blocks in three previous frames. If the temporal spatial dependency threshold value is two, candidate blocks 200, 202, and 204 have dependencies that are below the threshold value and therefore may be used to encode the current block. Block 206, however, has a dependency that exceeds the threshold value and thus will not be used to encode the current block. Because some candidate blocks, namely blocks 200, 202, and 204, do not exceed the threshold value, the encoder will not force intra-coding on the current block. Instead, the current block may be inter-coded, subject to other factors.

Once the coding on a current block in frame N is performed, the temporal spatial dependency value in the database 45 is updated so that frame N+1 may be encoded using the aforementioned techniques. For example, if inter-coding was used, the TSD value of the block that was just encoded is updated in the TSD database 45. In some cases, an entry may need to be created in the TSD database 45 for the block that was just encoded if no such record previously exists. If instead intra-coding was forced on the block, the dependency of the block that was just encoded may be reset to a value of zero, or it may be reset to some other value, as desired, in order to reflect that it no longer depends on blocks in previous frames.

It should be noted that the default temporal spatial dependency value in the database of a block is zero. Thus, when the encoder initially begins to develop the temporal spatial dependency history, all blocks begin with a value of zero. From that initialized state, the database accumulates data and develops a history for each block in a frame.

The temporal spatial dependency threshold value may be based on several factors, including the size of the display device on the destination device, the desired efficiency of the encoder, and the amount of allowable image quality degradation, for example.

Additionally, in some examples, the threshold value may be a predetermined fixed value. For example, it may be predetermined that no video block will have a temporal spatial dependency greater than three. Or, in at least one example, the threshold value may be variable, or adjustable, rather than a fixed value. For example, by choosing an adjustable threshold value, the encoder may adjust the threshold value to be lower for high texture areas of the ROI, such as a face, and may adjust the threshold value to be higher for low texture areas of the ROI, like a wall in the background. In this manner, the high texture areas, which are generally of more interest to the viewer, may have a higher video quality than the low textures areas. In general, the larger the range of spatial dependency, the more efficient the video encoding will be. But, decoding of the wider spatial area that results from a larger spatial dependency may result in slower panning support. Therefore, allowing the threshold value to be variable rather than fixed, depending on the requirements of different video applications, may allow for optimization between video quality and coding efficiency. In the example above, the balance between video quality and coding efficiency is struck by encoding the higher texture areas with higher video quality and the lower texture areas with lower video quality.

As mentioned above, mode select unit 84 of FIG. 4 uses the IR rate to determine whether to encode a block using inter- or intra-coding. The IR rate generally determines the number of blocks that will be intra-refreshed, and may be applied at the frame level or block level. The IR rate may be determined based on video content, or a combination of video content and channel condition. At least one example technique of the disclosure combines the techniques described above with the IR rate in order to increase efficiency. For example, in attempting to encode a current block "A" in frame N, the video encoder may decide that block "A" should be intra-coded based on excessive temporal spatial dependencies of a candidate block "B" in a previous frame N−1. Now, in the next frame N+1, the IR rate may be set such that block "A" will again be intra-coded. It should be clear that intra-refreshing block "A" in frame N+1 may be inefficient in some instances, given that block "A" was intra-coded in the previous frame. Therefore, it may be desirable for the IR rate to be adjusted based on whether or not a block has been previously intra-coded due to a temporal spatial dependency constraint. In some examples, an IR rate control unit may also be in communication with the temporal spatial dependency database such that the IR rate control can be adjusted based on the dependencies. In at least one example, the mode select unit 84 may provide feedback to an IR rate control mechanism such that if a block is intra-coded for reasons of dependency constraints, the IR rate can be adjusted accordingly.

Figure 10:
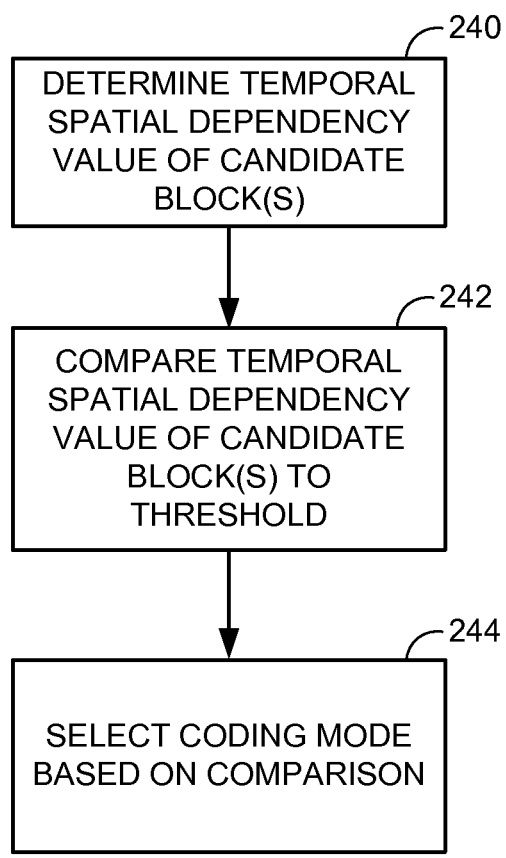
FIG. 10 is a flow diagram illustrating a coding mode determination method in accordance with this disclosure.

FIG. 10 is a flow diagram illustrating a coding mode determination method in accordance with this disclosure. In the example of FIG. 10, the video encoder determines a temporal spatial dependency of one or more candidate video blocks in a video frame (240). The temporal spatial dependency defines the number of video blocks in previous video frames on which a candidate video block depends. And, the number of video blocks in previous video frames on which the candidate video block depends defines a temporal spatial dependency value. For example, the candidate block of a frame N−1 may depend on a video block in frame N−2, and that video block may depend on a video block in frame N−3, which may depend on a video block in frame N−4. Thus, the candidate block has a temporal spatial dependency value of three. The video encoder 20 then compares the temporal spatial dependency value to a temporal spatial dependency threshold value (242). If, for example, the temporal spatial dependency threshold value was a fixed value of two, the temporal spatial dependency of the candidate block in the example above would exceed the threshold value. Then, the video encoder selects a coding mode for the current video block based on the comparison (244). If the temporal spatial dependency value exceeds the threshold, the video encoder forces the current block to be intra-coded. If the temporal spatial dependency does not exceed the threshold, the video encoder does not force intra-coding, and makes a mode decision for the block based on other factors such as intra-refresh (IR) rate, coding distortion indicated by motion compensation, and/or available coding bit rate.

Figure 11:
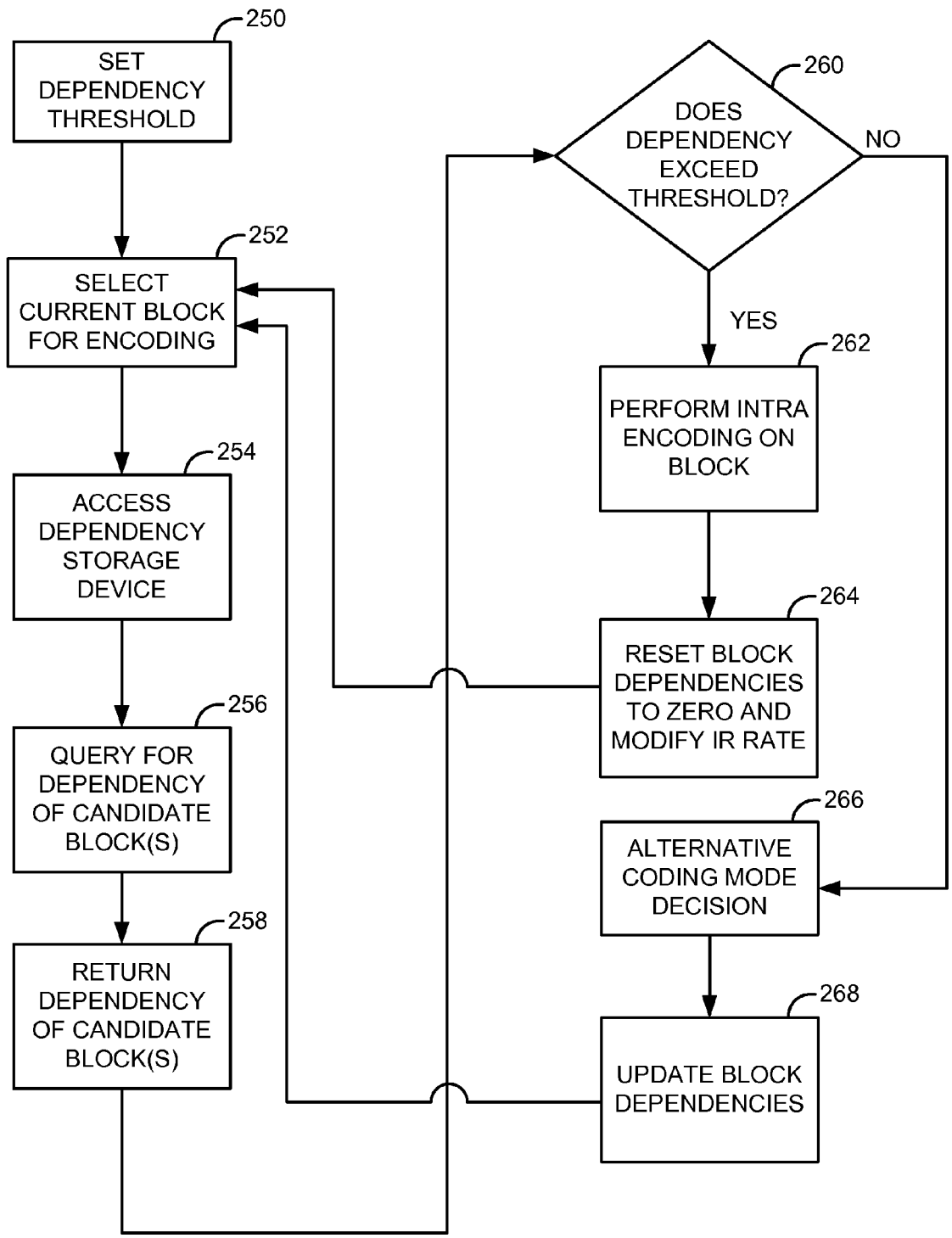
FIG. 11 is a flow diagram illustrating another coding mode determination method in accordance with this disclosure.

FIG. 11 is a flow diagram illustrating another coding mode determination method in accordance with this disclosure. In the example in FIG. 11, the temporal spatial dependency threshold value for a block is set (250). The video encoder then selects a block in the current video frame for encoding (252). The video encoder accesses the temporal spatial dependency storage device 45 (254) and queries storage device 45 for the dependencies of one or more candidate blocks (256). A temporal spatial dependency value is returned to the video encoder (258). The video encoder compares the temporal spatial dependency returned and the temporal spatial dependency threshold (260). If the temporal spatial dependency exceeds the threshold, the encoder forces intra-coding mode for the current block (262). Then, the block dependencies in storage device 45 are reset and, in some examples, the IR rate is modified (264), and the video encoder is ready to select a new block for encoding (252). If the temporal spatial dependency does not exceed the threshold, then the video encoder does not force intra-coding, and instead makes a mode decision for the block based on other factors such as intra-refresh (IR) rate, coding distortion indicated by motion compensation, and/or available coding bit rate (266). Then, the dependencies in the database are updated to reflect that the block was encoded based on blocks in previous frames (268) and the video encoder is ready to select a new block for encoding (252).

Using the techniques described above, it is possible to perform continuously localized ROI video decoding because the blocks in a ROI only require the availability of decoded blocks within a pre-determined range beyond the ROI from previous frames. And, random access of blocks for decoding and display may be done by embedding block position lookup tables in a UserData field supported by all video codecs.

Referring again to FIG. 3, and as mentioned above, ROI selection unit 63 defines the ROI based on user input or application commands and concentrates the decoding on a particular region. In some examples, portions of the frame not defined within the ROI are not decoded. By not decoding non-ROI portions, decoder 30 may substantially reduce the amount of processing needed to decode and present decoded video. ROI selection unit 63 outputs data defining the ROI selection area to prediction unit 62. The selection area may be defined by user input. A user may define the selection area using a stylus, a touchscreen, a resizable rectangle, numeric indication, or the like. Prediction unit 62 requires the ROI selection area in order to begin decoding the blocks within the ROI. For conceptual purposes only, display device 32 of destination device 14 may have a size of m×m frames, and the user may select an ROI using an ROI selection unit 63 such as a touchscreen. As an example, the selected ROI may have a size of n×n, where n is less than m. Although square ROI's are described for purposes of illustration, the ROI may be rectangular or have an irregular shape, e.g., as defined by a stylus. The data defining the n×n area is output from the ROI selection unit 63 to prediction unit 62. Prediction unit 62 then knows the exact blocks it must decode in order to produce the ROI.

However, because of the temporal propagation of spatial dependencies described above, and shown in FIG. 6, it is unlikely that decoder 30 can simply decode the blocks within the ROI. Rather, decoder 30 must decode additional blocks, outside of the ROI. Referring again to FIG. 6, if it is assumed for purposes of illustration that the ROI is a region of 3×3=9 blocks, decoding the center block 100 of frame N may require that any of the 3×3=9 blocks shown in previous frame N−1 be available to the decoder. In order to be available to the decoder, the 9 blocks of previous frame N−1 may require that any of the 5×5=25 blocks in frame N−2 also be available to the decoder, as those blocks may serve as reference blocks for any of the 3×3=9 blocks, subject to the results of a motion search. And, the 25 blocks of frame N−2 may require that any of the 7×7=49 blocks in frame N−3 also be available to the decoder. Finally, the 49 blocks of frame N−3 may require that any of the 9×9=81 blocks in frame N−4 also be available to the decoder.

Continuing the example above, if the ROI was the 3×3 area shown in frame N−1 in FIG. 6, the decoder may need any of the 5×5=25 blocks in frame N−2 also be available to the decoder. And, the 25 blocks of frame N−3 may require that any of the 7×7=49 blocks in frame N−3 also be available to the decoder, and so forth. In order for the decoder to decide how much bigger the video area to be decoded needs to be compared to the ROI, the decoder, and in particular prediction unit 62, must know the temporal spatial dependency (TSD) value enforced during the encoding process.

The TSD value enforced during encoding may be performed on an entire frame, on individual slices, or on individual macroblocks. Hence, a frame could have multiple TSD values assigned to portions of the frame (e.g., slices or MBs). In one example, a TSD value enforced during encoding may be transmitted as data in a header within the encoded video bitstream and received by prediction unit 62. The TSD value may be transmitted in the form of one or more header syntax elements. In some examples, the TSD value may form part of a frame header. In other examples, the TSD value may form part of a slice header. In some examples, the TSD value may form part of a block header (e.g., a macroblock header). In other examples, the TSD value of individual macroblocks may form part of the slice or frame header.

The TSD value transmitted in the video bitstream may, in some examples, be the maximum temporal spatial dependency range of the frame or slice. For example, if the dependency range varies for each block in a video frame, then the TSD value transmitted may be the maximum dependency range. By way of specific example, if all of the blocks in a video frame had dependencies of either 2, 3, or 4, the TSD value transmitted in a header in the bitstream would be 4. Transmitting the maximum temporal spatial dependency value ensures that the decoder will decode a sufficient number blocks in a previous frame so that a sufficient number of reference blocks are available to it for decoding blocks in subsequent video frames.

In other examples, the TSD value transmitted in the video bitstream may be the actual dependency value. In the example above, prediction unit 62 would receive information in block headers indicating that a first block had a dependency of 2, a second block had a dependency of 3, a third block had a dependency of 4, a fourth block had a dependency of 3, and so forth.

In yet another example, if the encoder had constrained temporal spatial dependency ranges at a slice level, the actual dependency range for each slice may be transmitted. For example, if a frame at three slices with slice one having TSD value of 2, slice two having a TSD value of three, and slice three having a TSD value of 4, prediction unit 62 would receive the TSD value information for all three slices in separate slice headers.

Once prediction unit 62 receives the data defining the ROI selection area and the TSD value, it may begin generating prediction blocks. By way of specific example, if the ROI selection area was a 3×3 area and the TSD value transmitted was a maximum temporal spatial dependency range with a value of 3, prediction unit 62 would determine that a 7×7 decoded area is the minimum area needed to present the user with the 3×3 ROI. Again, this 7×7 area, which is a portion of the video frame larger than the ROI, is defined by the temporal spatial dependency value. Prediction unit 62 may then access reference frame store 68 and determine which reference frames should be used for prediction.

In the example above, the minimum 7×7 decoded area is sufficient if the user is not panning or zooming, i.e., if the ROI is relatively static from frame to frame. However, if only the minimum area is being decoded and the user is panning or zooming, there may be a delay in presenting the image to the user until a sufficient region of reference blocks are decoded and become available. Thus, it may be desirable for the decoder to decode an area greater than the minimum area defined by the TSD value, but still less than the entire video frame. For example, if the user is panning, the decoder may decode a 7×8 area in order for there to be sufficient decoded blocks available. That is, an additional ROI margin may be decoded that extends beyond both the minimum area needed to present the user with the desired ROI as well as the ROI.

In general, zooming may refer to zooming in or out to enlarge or shrink the ROI within a frame. Panning may refer to moving to the left or right horizontally, or moving up or down vertically, within a frame. In addition to selecting the ROI, decoder 30 may include one or more post-processing units to scale pixel data in the decoded video to support zooming, e.g., by pixel interpolation or decimation. The additional ROI margin may selected as a function of the maximum change (i.e., zoom or pan change) allowable per frame. A maximum change allowable per frame may be set as a constraint on the user's ability to pan or zoom. For example, the user may be constrained such that he or she may only pan left or right at a maximum rate of x macroblocks per frame, or x macroblocks between successive frames. Based on this constraint, it may be necessary for the decoder to decode a 7×8 macroblock area in frame N−2, i.e., with an additional margin of decoded blocks, in order to keep pace with the user's panning. In other examples, it may be necessary for the decoder to decode a 7×9 macroblock area in frame N−2, as the decoder may not recognize which direction the user will pan. Similarly, with respect to up or down panning, or tilting, it may be necessary for the decoder to decode a 8×7 macroblock area in frame N−2, i.e., with an additional margin of decoded blocks, in order to keep pace with the user's tilting. In other examples, it may be necessary for the decoder to decode a 9×7 macroblock area in frame N−2, as the decoder may not recognize which direction the user will tilt. In some examples, the additional ROI margin may be linearly related to the maximum change allowable per frame. For example, if a maximum panning change of one macroblock per frame is allowed, then the margin of macroblocks that should be decoded to support left, right, up or down panning should add a border of one decoded macroblock around the entire decoded region of macroblocks. For a 3×3 macroblock ROI in frame N, knowing that a given TSD value mandates a 7×7 decoded region of macroblocks in frame N−2, an additional margin of one macroblock to support panning or zooming at no more than one macroblock per frame may require a decoded region of 9×9 in frame N−2. In other examples, the additional ROI margin may be related to the maximum change allowable per frame in a non-linear relationship.

Figure 12:
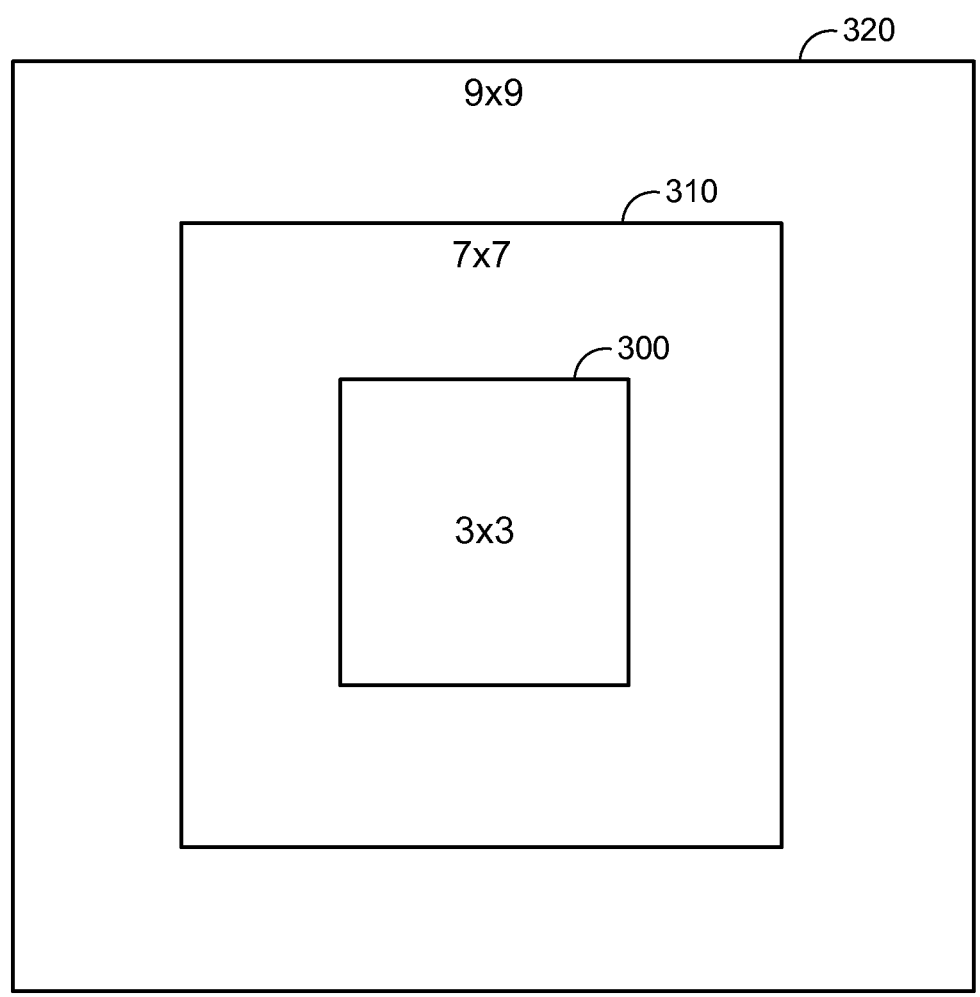
FIG. 12 is a conceptual drawing illustrating a region-of-interest (ROI), a first area outside the ROI that may need to be decoded, and a second area outside the first area that may also need to be decoded.

FIG. 12 is a conceptual drawing illustrating a region-of-interest (ROI), a first area outside the ROI that may need to be decoded, and a second area outside the first area that may also need to be decoded. FIG. 12 illustrates a 3×3 ROI area 300, a 7×7 area 310 encompassing the 3×3 ROI area 300 which is needed to decode the 3×3 area 300 based upon the TSD value, and an additional ROI margin 320 that extends beyond the minimum 7×7 area 310 and includes the 7×7 area 310 as well as the 3×3 area 300. The ROI margin is shown as a 9×9 block, but it need not be square. And, the ROI margin may be larger, depending on the maximum change allowable per frame. As mentioned above, if the user defines a 3×3 ROI area 300, then a larger area 310 may need to be decoded, due to the temporal propagation of spatial dependencies. If the encoded bitstream included a header indicating that the maximum TSD value of a frame is 2, then the minimum area needed to decode the 3×3 ROI area 300 is the 7×7 area 310. However, because the user may pan or zoom, it may be desirable for there to be an additional ROI margin 320 so that the decoder can decode blocks ahead of time as the user pans or zooms.

It should be noted again that a 3×3 ROI area is just for conceptual purposes and that the number of MBs in an ROI ordinarily will be larger. Furthermore, a small ROI area may be scaled up to fill the entire screen or a substantial portion of the screen, consistent with zoom in and pixel scaling by interpolation in post-processing.

It should also be noted that if the encoder had constrained temporal spatial dependency ranges at a slice level, the ROI area 300, the area 310 encompassing the 3×3 ROI area 300, and the additional ROI margin 320 may vary across slice boundaries. For example, consider a frame that is divided into 3 horizontal slices, and an ROI that extends between slices 1 and 2. If slice 1 had a TSD value of 2 and slice 2 had a TSD value of 3, the resulting area needed to decode the 3×3 area is not a square like in FIG. 12. The area needed to decode the portion of the ROI located in slice 1 would be smaller than the area needed to decode the portion of the ROI located in slice 2 because the TSD value of slice 1 is less than the TSD value of slice 2. Decoding of an ROI that overlaps slice boundaries is achieved by transmitting the TSD value in the slice header, as mentioned above.

A similar problem to that described above with respect to slices is encountered when the TSD value is enforced at the macroblock level. However, in a similar fashion, decoding of an ROI is achieved by transmitting the TSD value in the macroblock header, as mentioned above.

In some examples, the maximum change allowable per frame may be determined by adding a fixed margin onto the area that needs to be decoded based upon the TSD value. In such a manner, the area that needs to be decoded based upon the TSD value and the additional ROI margin may be determined independently. When a user attempts to pan or zoom at a rate that is faster than the maximum change allowable per frame, display device 32 of destination device 14 may display a message to the user indicating that the user has exceeded the maximum change allowable. Or, in some examples, an audible signal may be generated by destination device 14 indicating that the maximum change allowable value has been exceeded. Or, in some examples, the user interface may be non-responsive to the request. Thus, the user may be prevented from panning or zooming at a rate faster than the maximum. The user may only be allowed to pan or zoom at a given rate consistent with the maximum change allowable. For example, if the user clicks an arrow with a stylus, the arrow only responds at a max rate of one macroblock per frame. It should be noted that the resolution of the pan or zoom may be at less than one macroblock. For example, each arrow click may result in movement of ¼ or ½ macroblock at a time per click.

In other examples, if the user exceeds a maximum change allowable per frame limit while panning or zooming, display device 32 displays a region of blank pixels in the area where blocks have not yet been decoded. For example, if the user is panning quickly to the left at a rate greater than the maximum limit, display device 32 may display a region of blank pixels along the left side of display device 32. Once the user stops panning, or begins panning at a rate slower than the maximum limit, the decoder may decode and then display the blocks defined by the blank pixels.

In some examples, if the user exceeds a maximum change allowable per frame limit, the decoder imposes a delay in updating display device 32. For example, if the user attempts to zoom in at a rate that exceeds a maximum change allowable per frame limit, the decoder may continue to decode and display the blocks in the ROI selected area that the user was viewing just prior to the zoom. Then, once the decoder has decoded the blocks in the new ROI selected area as defined by the zoom, the decoder may display the new decoded image. In such a manner, the user may continue to view video in the first ROI, but would have to wait a few frames until the decoder decodes the blocks in the second, zoomed ROI before the zoomed ROI is displayed.

Figure 13:
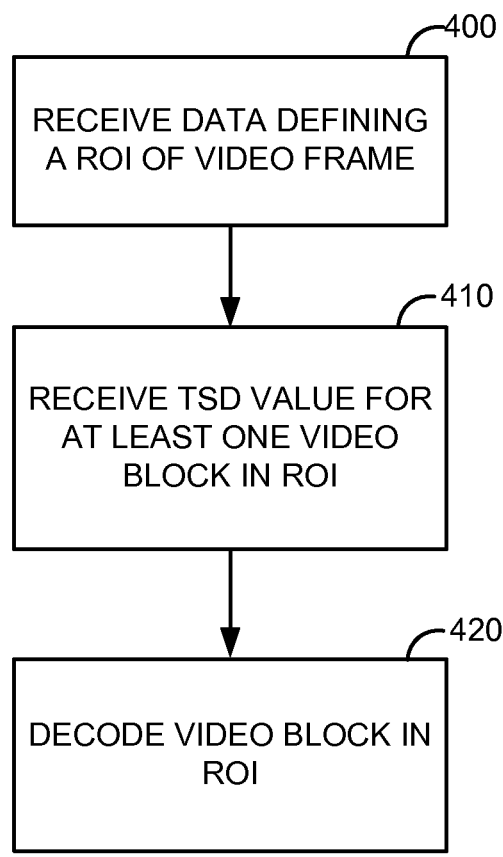
FIG. 13 is a flow diagram illustrating a decoding method in accordance with this disclosure.

FIG. 13 is a flow diagram illustrating a decoding method in accordance with this disclosure. Decoder 30 receives data defining a region-of-interest (ROI) via ROI selection unit 63 (400). Decoder 30 also receives via a header in the encoded video bitsteam a temporal spatial dependency (TSD) value for at least one block in the ROI (410). Decoder 30 then decodes a video block in the ROI (420) based on the data defining the ROI and the TSD value.

It should be noted that if a zoom or pan function is to be performed, in order to fill the display of the device, upscaling of resolution by interpolation may be used. Such upscaling may be accomplished in the pixel domain after decoding during a post-processing operation.

Using the decoding techniques described above may reduce power consumption, reduce computations, and reduce latency because only the blocks necessary to produce the ROI are decoded, rather than all the blocks in a frame.

Figure 14:
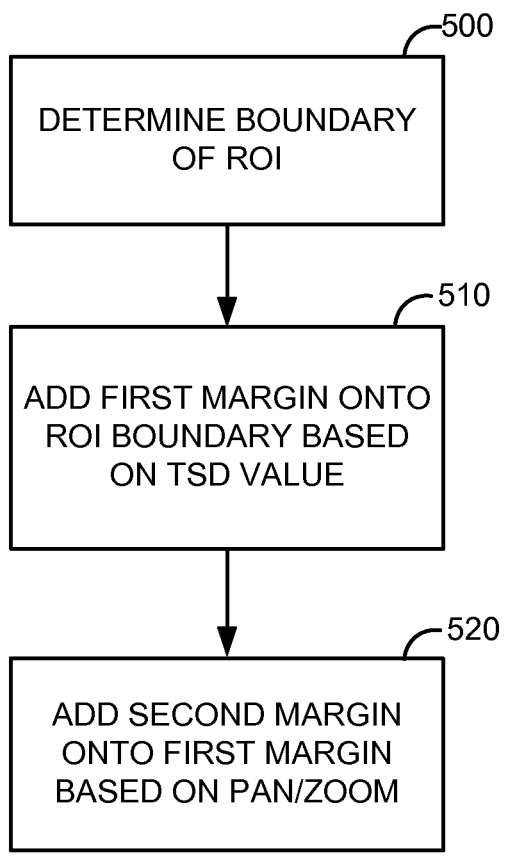
FIG. 14 is a flow diagram illustrating a method of determining an additional ROI margin for decoding a selected ROI area that will support panning, zooming, and tilting.

FIG. 14 is a flow diagram illustrating a method of determining an additional ROI margin for decoding a selected ROI area that will support panning, zooming, and tilting. The boundary of the ROI is determined (500). For example, the user may have used a stylus to select an ROI area. For conceptual purposes only, the ROI selection unit may determine that the user selected a 3×3 area for the ROI, so the boundary of the ROI is 3×3. The decoder then determines a first margin outside the ROI area that needs to be decoded, based on the TSD value, and adds the first margin onto the ROI boundary (510). Again, for example, if a TSD value was 3, the decoder may need to decode a 7×7 area encompassing the 3×3 ROI area. As such, the decoder adds a first margin of 2 MBs in each direction to the 3×3 ROI area. Then, the decoder determines a second margin outside the first margin that needs to be decoded in order to support the user panning, zooming, and tilting (520). For example, if the decoder needed to decode a 7×7 area based on a TSD value of 3 to support a 3×3 ROI area, the decoder adds a second margin onto the first margin to determine the additional ROI margin that extends beyond the 7×7 area. The second margin added to the first margin may, for example, result in a 9×9 area that needs to be decoded to support both decoding a 3×3 ROI and panning, zooming, tilting. Again, the 3×3 area is for conceptual purposes only; the ROI will ordinarily be larger.

The techniques described in this disclosure may allow continuous localized video decoding within a ROI. With localized video coding, a viewer may be permitted to define and manipulate the ROI from the decoder side, providing a unique video viewing experience for each viewing of the same video content. In some aspects, the techniques described in this disclosure may also reduce power consumption, particularly for hand-held devices, by permitting for ROI viewing with ROI-only decoding instead of full-frame decoding. The techniques described in this disclosure may also provide better utilization of the display window by allowing a viewer to display only the portion of the video content of interest to the viewer. In other aspects, the techniques described in this disclosure may also allow ROI viewing of video content that would otherwise exceed the processing and display capability of the device. The techniques described in this disclosure may also allow fundamental de-coupling between the video capture window and the viewing window. In some aspects, the techniques described in this disclosure may also allow ROI video zooming and panning, normally only possible during video capture prior to video encoding, during video playback from the decoding side.

The techniques described above may fundamentally decouple the video capture window and the viewing window. That is, the viewer may not be constrained to view the video content in the viewing window of a display device in the same way the video was captured. For example, in a scene with two people having a conversation, the viewer may choose to zoom in on only one person. In this manner, the viewing window on a display has been decoupled from the video capture window. Furthermore, the viewer may zoom and pan a ROI during video playback, traditionally only possible during video capture.

The techniques described herein may be implemented in hardware, software, firmware, or any combination thereof. If implemented in software, the techniques may be realized in part by a computer-readable medium comprising program code containing instructions encoded on the computer-readable medium that, when executed, cause a processor to perform one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some examples, the functionality described in this disclosure may be provided within dedicated software modules or hardware units configured for automatic object segmentation, or incorporated in an automatic object segmentation system.

The invention claimed is:

1. A method performed in a video encoder, the method comprising:
   determining a temporal spatial dependency value for each of a plurality of candidate reference video blocks in a reference frame for inter-coding a current block in a current video frame, the temporal spatial dependency value being a number that indicates how far over a temporal sequence of previously decoded video frames that spatial dependency propagates for a particular one of the candidate reference video blocks, wherein the previously decoded video frames are decoded prior to the reference frame;
   comparing the temporal spatial dependency value for each of the candidate reference video blocks to a threshold value;
   selecting a coding mode for the current block based on the comparison, wherein:
      when the temporal spatial dependency value for each of the candidate reference video blocks in the reference frame exceeds the threshold value, selecting the coding mode comprises selecting an intra-coding mode for the current block, and
      when the temporal spatial dependency value for at least one of the candidate reference video blocks in the reference frame does not exceed the threshold value, selecting the coding mode comprises selecting either an inter-coding mode or the intra-coding mode for the current block;
   encoding the current block in the current video frame according to the selected coding mode;
   upon intra-coding the current block, updating a current temporal spatial dependency value for the current block to be equal to zero; and
   upon inter-coding the current block based on the one of the candidate reference video blocks in the reference frame, updating the current temporal spatial dependency value for the current block to be equal to the temporal spatial dependency value for the one of the candidate reference video blocks incremented by one so as to count the reference frame as part of the temporal sequence of previously decoded video frames over which spatial dependency propagates for the current block in the current video frame.

2. The method of claim 1, further comprising:
   when a set of one or more of the candidate reference video blocks each has a temporal spatial dependency value that does not exceed the threshold value, selecting one of the candidate reference video blocks from the set for the current block, wherein selecting the coding mode comprises selecting the inter-coding mode based on the selected one of the candidate reference video blocks for the current block.

3. The method of claim 1, wherein, when the temporal spatial dependency value for at least one of the candidate reference video blocks in the reference frame does not exceed the threshold value, selecting the coding mode comprises selecting either the inter-coding mode or the intra-coding mode for the current block based on at least one of coding bit rate, intra-refresh rate, distortion, or channel loss probability.

4. The method of claim 1, wherein the threshold value is fixed.

5. The method of claim 1, wherein the threshold value is variable.

6. The method of claim 1, further comprising modifying an intra-refresh (IR) rate based on the coding mode selection.

7. A video encoding device comprising:
   a storage device that stores a temporal spatial dependency value for each of a plurality of candidate reference video blocks in a reference frame for inter-coding a current block in a current video frame; and
   a video encoder that:
      determines the temporal spatial dependency value for each of the candidate reference video blocks from the storage device, the temporal spatial dependency value being a number that indicates how far over a temporal sequence of previously decoded video frames that spatial dependency propagates for a particular one of the candidate reference video blocks, wherein the previously decoded video frames are decoded prior to the reference frame,
      compares the temporal spatial dependency value for each of the candidate reference video blocks to a threshold value,
      selects a coding mode for the current block based on the comparison, wherein:
         when the temporal spatial dependency value for each of the candidate reference video blocks in the reference frame exceeds the threshold value, the video encoder selects an intra-coding mode for the current block, and
         when the temporal spatial dependency value for at least one of the candidate reference video blocks in the reference frame does not exceed the threshold value, the video encoder selects either an inter-coding mode or the intra-coding mode for the current block,
      encodes the current block in the current video frame according to the selected coding mode;
      upon intra-coding the current block, updates a current temporal spatial dependency value for the current block to be equal to zero, and
      upon inter-coding the current block based on the one of the candidate reference video blocks in the reference frame, updates the current temporal spatial dependency value for the current block to be equal to the temporal spatial dependency value for the one of the candidate reference video blocks incremented by one so as to count the reference frame as part of the temporal sequence of previously decoded video frames over which spatial dependency propagates for the current block in the current video frame.

8. The device of claim 7, wherein, when a set of one or more of the candidate reference video blocks each has a temporal spatial dependency value that does not exceed the threshold value, the video encoder selects one of the candidate reference video blocks from the set for the current block, and selects the inter-coding mode based on the selected one of the candidate reference video blocks for the current block.

9. The device of claim 7, wherein, when the temporal spatial dependency value for at least one of the candidate reference video blocks in the reference frame does not exceed the threshold value, the video encoder selects either the inter-coding mode or the intra-coding mode for the current block based on at least one of coding bit rate, intra-refresh rate, distortion, or channel loss probability.

10. The device of claim 7, wherein the threshold value is fixed.

11. The device of claim 7, wherein the threshold value is variable.

12. The device of claim 7, wherein the video encoder modifies an intra-refresh (IR) rate based on the coding mode selection.

13. The device of claim 7, further comprising a wireless communications device.

14. The device of claim 7, further comprising an integrated circuit device.

15. A non-transitory computer-readable medium comprising instructions encoded on the computer-readable medium that, upon execution, cause a processor within a video encoder to:
- determine a temporal spatial dependency value for each of a plurality of candidate reference video blocks in a reference frame for inter-coding a current block in a current video frame, the temporal spatial dependency value being a number that indicates how far over a temporal sequence of previously decoded video frames that spatial dependency propagates for a particular one of the candidate reference video blocks, wherein the previously decoded video frames are decoded prior to the reference frame;
- compare the temporal spatial dependency value for each of the candidate reference video blocks to a threshold value;
- select a coding mode for the current block based on the comparison, wherein:
  - when the temporal spatial dependency value for each of the candidate reference video blocks in the reference frame exceeds the threshold value, the instructions cause the processor to select an intra-coding mode for the current block, and
  - when the temporal spatial dependency value for at least one of the candidate reference video blocks in the reference frame does not exceed the threshold value, the instructions cause the processor to select either an inter-coding mode or the intra-coding mode for the current block;
- encode the current block in the current video frame according to the selected coding mode;
- upon intra-coding the current block, update a current temporal spatial dependency value for the current block to be equal to zero; and
- upon inter-coding the current block based on the one of the candidate reference video blocks in the reference frame, update the current temporal spatial dependency value for the current block to be equal to the temporal spatial dependency value for the one of the candidate reference video blocks incremented by one so as to count the reference frame as part of the temporal sequence of previously decoded video frames over which spatial dependency propagates for the current block in the current video frame.

16. The non-transitory computer-readable medium of claim 15, further comprising instructions that cause the processor to:
- when a set of one or more of the candidate reference video blocks each has a temporal spatial dependency value that does not exceed the threshold value, select one of the candidate reference video blocks from the set for the current block; and
- select the inter-coding mode based on the selected one of the candidate reference video blocks for the current block.

17. The non-transitory computer-readable medium of claim 15, further comprising instructions that cause the processor to, when the temporal spatial dependency value for at least one of the candidate reference video blocks in the reference frame does not exceed the threshold value, select either the inter-coding mode or the intra-coding mode for the current block based on at least one of coding bit rate, intra-refresh rate, distortion, or channel loss probability.

18. The non-transitory computer-readable medium of claim 15, wherein the threshold value is fixed.

19. The non-transitory computer-readable medium of claim 15, wherein the threshold value is variable.

20. The non-transitory computer-readable medium of claim 15, further comprising instructions to cause the processor to:
- modify an intra-refresh (IR) rate based on the coding mode selection.

21. A video encoding device comprising:
- means for determining a temporal spatial dependency value for each of a plurality of candidate reference video blocks in a reference frame for inter-coding a current block in a current video frame, the temporal spatial dependency value being a number that indicates how far over a temporal sequence of previously decoded video frames that spatial dependency propagates for a particular one of the candidate reference video blocks, wherein the previously decoded video frames are decoded prior to the reference frame;
- means for comparing the temporal spatial dependency value for each of the candidate reference video blocks to a threshold value;
- means for selecting a coding mode for the current block based on the comparison, wherein:
  - when the temporal spatial dependency value for each of the candidate reference video blocks in the reference frame exceeds the threshold value, the means for selecting the coding mode comprise means for selecting an intra-coding mode for the current block, and
  - when the temporal spatial dependency value for at least one of the candidate reference video blocks in the reference frame does not exceed the threshold value, the means for selecting the coding mode comprise means for selecting either an inter-coding mode or the intra-coding mode for the current block;
- means for encoding the current block in the current video frame according to the selected coding mode;
- means for, upon intra-coding the current block, updating a current temporal spatial dependency value for the current block to be equal to zero; and
- means for, upon inter-coding the current block based on the one of the candidate reference video blocks in the reference frame, updating the current temporal spatial dependency value for the current block to be equal to the temporal spatial dependency value for the one of the candidate reference video blocks incremented by one to count the reference frame as part of the temporal sequence of previously decoded video frames over which spatial dependency propagates for the current block in the current video frame.

22. The device of claim 21, further comprising:
- means for, when a set of one or more of the candidate reference video blocks each has a temporal spatial dependency value that does not exceed the threshold value, selecting one of the candidate reference video blocks from the set for the current block,
- wherein the means for selecting the coding mode comprise means for selecting the inter-coding mode based on the selected one of the candidate reference video blocks for the current block.

23. The device of claim 21, wherein the means for selecting the coding mode comprise means for, when the temporal spatial dependency value of at least one of the candidate reference video blocks in the reference frame does not exceed the threshold value, selecting either the inter-coding mode or the intra-coding mode for the current block based on at least one of coding bit rate, intra-refresh rate, distortion, or channel loss probability.

24. The device of claim 21, wherein the threshold value is fixed.

25. The device of claim 21, wherein the threshold value is variable.

26. The device of claim 21, further comprising:
means for modifying an intra-refresh (IR) rate based on the coding mode selection.

27. The method of claim 1, further comprising storing the temporal spatial dependency value for each of the candidate reference video blocks in a storage device associated with the video encoder.

28. The non-transitory computer-readable medium of claim 15, further comprising instructions that cause the processor to store the temporal spatial dependency value for each of the candidate reference video blocks in a storage device associated with the video encoder.

29. The device of claim 21, further comprising means for storing the temporal spatial dependency value for each of the candidate reference video blocks in a storage device associated with the video encoding device.

* * * * *